(12) United States Patent
Chiu et al.

(10) Patent No.: US 10,123,044 B2
(45) Date of Patent: Nov. 6, 2018

(54) PARTIAL DECODING CIRCUIT OF VIDEO ENCODER/DECODER FOR DEALING WITH INVERSE SECOND TRANSFORM AND PARTIAL ENCODING CIRCUIT OF VIDEO ENCODER FOR DEALING WITH SECOND TRANSFORM

(71) Applicant: MEDIATEK INC., Hsin-Chu (TW)

(72) Inventors: Min-Hao Chiu, Hsinchu (TW); Yu-Chuan Wang, Tainan (TW); Yung-Chang Chang, New Taipei (TW)

(73) Assignee: MEDIATEK INC., Hsin-Chu (TW)

(*) Notice: Subject to any disclaimer, the term of this patent is extended or adjusted under 35 U.S.C. 154(b) by 245 days.

(21) Appl. No.: 15/209,765

(22) Filed: Jul. 14, 2016

(65) Prior Publication Data

US 2017/0019686 A1 Jan. 19, 2017

Related U.S. Application Data

(60) Provisional application No. 62/193,257, filed on Jul. 16, 2015.

(51) Int. Cl.
*H04N 19/60* (2014.01)
*H04N 19/12* (2014.01)
(Continued)

(52) U.S. Cl.
CPC .............. *H04N 19/60* (2014.11); *H04N 19/12* (2014.11); *H04N 19/547* (2014.11); *H04N 19/62* (2014.11); *H04N 19/88* (2014.11)

(58) Field of Classification Search
CPC ...... H04N 19/12; H04N 19/547; H04N 19/60; H04N 19/62; H04N 19/88; H04N 19/124; H04N 19/176; H04N 19/44
See application file for complete search history.

(56) References Cited

U.S. PATENT DOCUMENTS 6,674,910 B1 * 1/2004 Moon .................. H04N 19/176
375/E7.143
2001/0016010 A1 * 8/2001 Kim ..................... H04N 5/4401
375/240.25

(Continued)

*Primary Examiner* — Anner N Holder
(74) *Attorney, Agent, or Firm* — Winston Hsu

(57) ABSTRACT

A partial decoding circuit with inverse second transform has a transpose buffer, a first-direction inverse residual transform circuit, and a second-direction inverse residual transform circuit. The transpose buffer stores an intermediate inverse residual transform result. The first-direction inverse residual transform circuit processes an inverse quantization output to generate the intermediate inverse residual transform result to the transpose buffer. The second-direction inverse residual transform circuit accesses the transpose buffer to retrieve the intermediate inverse residual transform result, and processes the intermediate inverse residual transform result to generate a final inverse residual transform result, where the final inverse residual transform result of the inverse second transform is further processed by an inverse transform circuit. The first-direction inverse residual transform circuit and the second-direction inverse residual transform circuit process partial residual transform data of different process units in a parallel processing manner.

14 Claims, 20 Drawing Sheets

(51) Int. Cl.
*H04N 19/62* (2014.01)
*H04N 19/88* (2014.01)
*H04N 19/547* (2014.01)

(56) References Cited

U.S. PATENT DOCUMENTS

| | | | |
|---|---|---|---|
| 2005/0262510 A1* | 11/2005 | Parameswaran | G06F 15/7842 718/105 |
| 2007/0286283 A1* | 12/2007 | Yin | H04N 19/70 375/240.16 |
| 2012/0057630 A1* | 3/2012 | Saxena | H04N 19/105 375/240.03 |
| 2013/0243083 A1* | 9/2013 | Sezer | H04N 19/60 375/240.02 |
| 2013/0272423 A1* | 10/2013 | Chien | H04N 19/176 375/240.18 |
| 2015/0117548 A1* | 4/2015 | Lee | H04N 19/176 375/240.25 |
| 2016/0227253 A1* | 8/2016 | Sato | H04N 19/159 |
| 2017/0127065 A1* | 5/2017 | Sezer | H04N 19/152 |

\* cited by examiner

PARTIAL DECODING CIRCUIT OF VIDEO ENCODER/DECODER FOR DEALING WITH INVERSE SECOND TRANSFORM AND PARTIAL ENCODING CIRCUIT OF VIDEO ENCODER FOR DEALING WITH SECOND TRANSFORM

CROSS REFERENCE TO RELATED APPLICATIONS

This application claims the benefit of U.S. provisional application No. 62/193,257, filed on Jul. 16, 2015 and incorporated herein by reference.

BACKGROUND

The present invention relates to a video decoder design and a video encoder design, and more particularly, to a partial decoding circuit in a video encoder/decoder for dealing with inverse second transform and a partial encoding circuit of a video encoder for dealing with second transform.

The conventional video coding standards generally adopt a block based coding technique to exploit spatial and temporal redundancy. For example, the basic approach is to divide the whole source frame into a plurality of blocks, perform prediction on each block, transform residuals of each block, and perform quantization, scan and entropy encoding. Besides, a reconstructed frame is generated in an internal decoding loop of the video encoder to provide reference pixel data used for coding following blocks. For example, inverse scan, inverse quantization, and inverse transform may be included in the internal decoding loop of the video encoder to recover residuals of each block that will be added to predicted samples of each block for generating a reconstructed frame. The functions of the internal decoding loop of the video encoder are also implemented in a video decoder for recovering residuals of each block and generating a reconstructed frame.

For certain video coding standards, a multi-stage inverse transform that sequentially performs an inverse second transform and a typical inverse transform may be implemented in a video encoder/decoder, and a multi-stage transform that sequentially performs a typical transform and a second transform may be implemented in a video encoder. There is a need for an innovative inverse residual transform design with low cost and/or high performance and an innovative residual transform design with low cost and/or high performance for dealing with the inverse second transform and the second transform, respectively.

SUMMARY

One of the objectives of the claimed invention is to provide a partial decoding circuit in a video encoder/decoder for dealing with inverse second transform and a partial encoding circuit of a video encoder for dealing with second transform.

According to a first aspect of the present invention, an exemplary partial decoding circuit with inverse second transform is disclosed. The exemplary partial decoding circuit includes a transpose buffer, a first-direction inverse residual transform circuit, and a second-direction inverse residual transform circuit. The transpose buffer is arranged to store an intermediate inverse residual transform result of the inverse second transform. The first-direction inverse residual transform circuit is arranged to process an inverse quantization output of an inverse quantization circuit to generate the intermediate inverse residual transform result to the transpose buffer. The second-direction inverse residual transform circuit is arranged to access the transpose buffer to retrieve the intermediate inverse residual transform result, and process the intermediate inverse residual transform result to generate a final inverse residual transform result of the inverse second transform, wherein the final inverse residual transform result of the inverse second transform is further processed by an inverse transform circuit. The first-direction inverse residual transform circuit and the second-direction inverse residual transform circuit are arranged to process partial residual transform data of different process units in a parallel processing manner.

According to a second aspect of the present invention, an exemplary partial encoding circuit with second transform is disclosed. The exemplary partial encoding circuit includes a transpose buffer, a first-direction residual transform circuit, and a second-direction residual transform circuit. The transpose buffer is arranged to store an intermediate residual transform result of the second transform. The first-direction residual transform circuit is arranged to process a transform output of a transform circuit to generate the intermediate residual transform result to the transpose buffer. The second-direction residual transform circuit is arranged to access the transpose buffer to retrieve the intermediate residual transform result, and process the intermediate residual transform result to generate a final residual transform result of the second transform, wherein the final residual transform result is further processed by a quantization circuit. The first-direction residual transform circuit and the second-direction residual transform circuit are arranged to process partial residual transform data of different process units in a parallel processing manner.

According to a third aspect of the present invention, an exemplary partial decoding circuit with inverse second transform is disclosed. The exemplary partial decoding circuit includes a transpose buffer and a shared inverse residual transform circuit. The transpose buffer is arranged to store an intermediate inverse residual transform result of the second transform. The shared inverse residual transform circuit is arranged to employ a same processing kernel to perform a first-direction inverse residual transform operation and a second-direction inverse residual transform operation, wherein the first-direction inverse residual transform operation processes an inverse quantization output of an inverse quantization circuit to generate the intermediate inverse residual transform result to the transpose buffer; the second-direction inverse residual transform operation accesses the transpose buffer to retrieve the intermediate inverse residual transform result, and processes the intermediate inverse residual transform result to generate a final inverse residual transform result of the inverse second transform; and the final inverse residual transform result is further processed by an inverse transform circuit.

According to a fourth aspect of the present invention, an exemplary partial encoding circuit with second transform is disclosed. The exemplary partial encoding circuit includes a transpose buffer and a shared residual transform circuit. The transpose buffer is arranged to store an intermediate residual transform result of the second transform. The shared residual transform circuit is arranged to employ a same processing kernel to perform a first-direction residual transform operation and a second-direction residual transform operation, wherein the first-direction residual transform operation processes a transform output of a transform circuit to generate the intermediate residual transform result to the transpose buffer, and the second-direction residual transform operation accesses the transpose buffer to retrieve the intermediate residual transform result, processes the intermediate residual transform result to generate a final residual transform result of the second transform, and the final residual transform result is further processed by a quantization circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

For certain video coding standards, a second transform function and an inverse second transform function may be implemented in a video encoder, and an inverse second transform function may be implemented in a video decoder. For example, the second generation of Audio-video coding standard (AVS2) is an application-oriented video coding standard aiming at higher video coding efficiency. In accordance with the AVS2 coding standard, a multi-stage inverse transform that sequentially performs inverse second transform and typical inverse transform (e.g., inverse discrete cosine transform (IDCT)) is proposed, and a multi-stage transform that sequentially performs typical transform (e.g., discrete cosine transform (DCT)) and second transform is proposed. Since a video encoder has a decoding loop embedded therein, the multi-stage inverse transform is implemented in both of a video encoder and a video encoder. With regard to the multi-stage transform, it is implemented in a video encoder.

Figure 1:
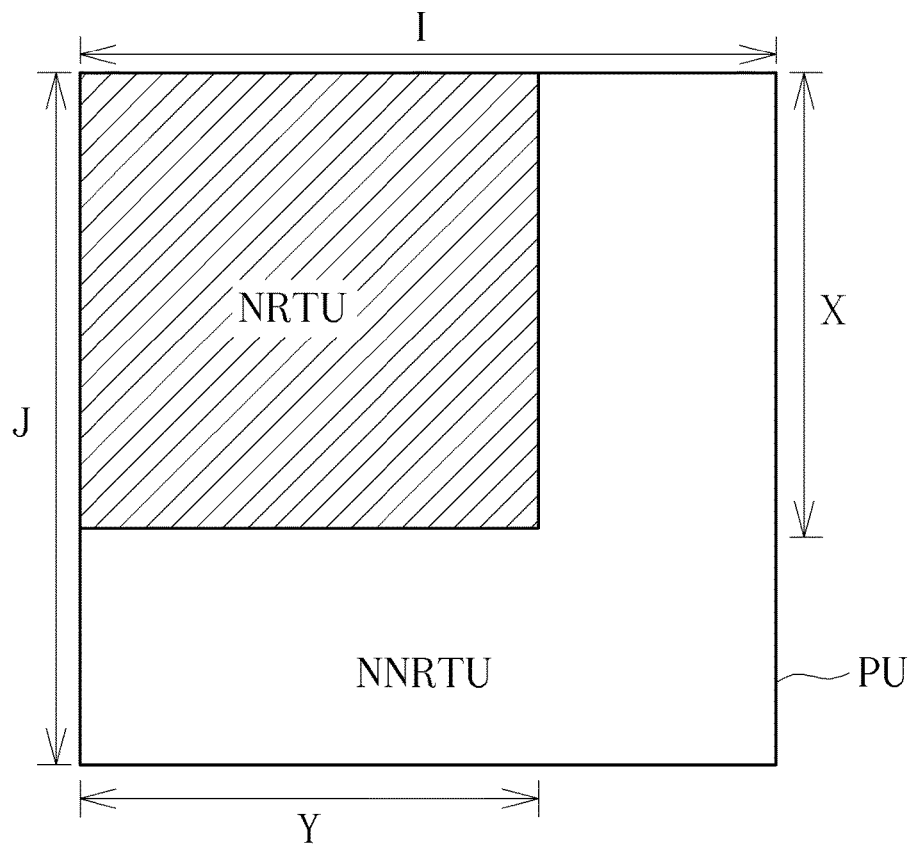
FIG. 1 is a diagram illustrating a process unit (PU) according to an embodiment of the present invention.

FIG. 1 is a diagram illustrating a process unit (PU) according to an embodiment of the present invention. One PU to be encoded may include residual data to be processed by typical transform (e.g., DCT), and may include residual data to be processed by typical transform (e.g., DCT) and second transform. Similarly, one PU to be decoded may include transform residual data to be processed by typical inverse transform (e.g., IDCT), and may include transform residual data to be processed inverse second transform and typical inverse transform (e.g., IDCT). As shown in FIG. 1, one PU is an I-by-J block composed of residual data, where I and J are positive integers. The PU may be categorized into a novel residual transform unit (NRTU) and a non-novel residual transform unit (NNRTU). The NRTU is an X-by-Y block as indicated by a shaded area in FIG. 1, where X and Y are positive integers, and X≤I and Y≤J. As shown in FIG. 1, the NRTU is a part of the PU, and does not belong to the NNRTU. Hence, the NNRTU is a remaining part of the PU as indicated by a blank area in FIG. 1. The NRTU (e.g., 4×4 residual data block) will undergo typical transform and second transform in a video encoder, and will undergo inverse second transform and typical inverse transform in a video encoder/decoder. However, the NNRTU will undergo typical transform, but no second transform, in a video encoder, and will undergo inverse transform, but no inverse second transform, in a video encoder/decoder. In other words, the second transform/inverse second transform is applied to NRTU rather than NNRTU.

Figure 2:
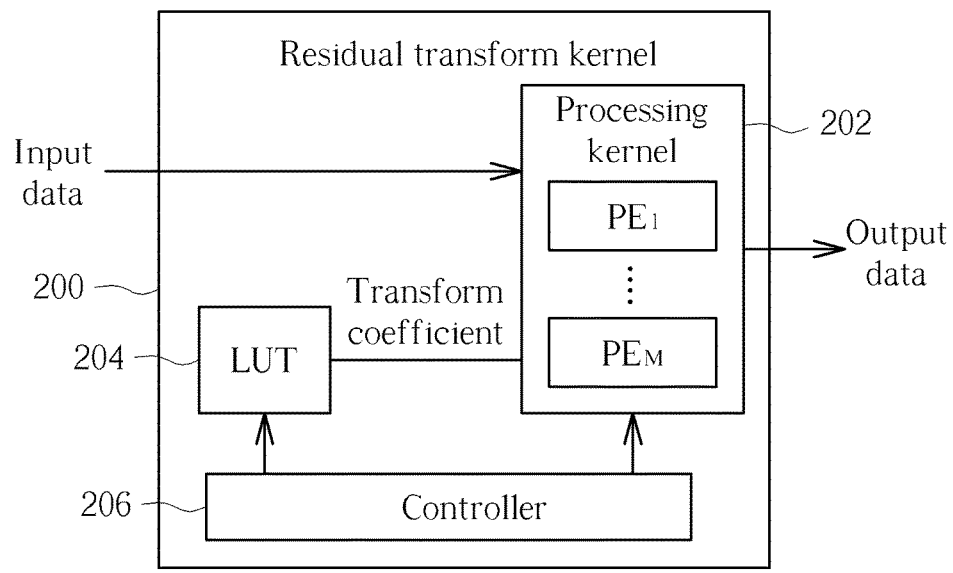
FIG. 2 is a diagram illustrating a residual transform kernel according to an embodiment of the present invention.
Figure 3:
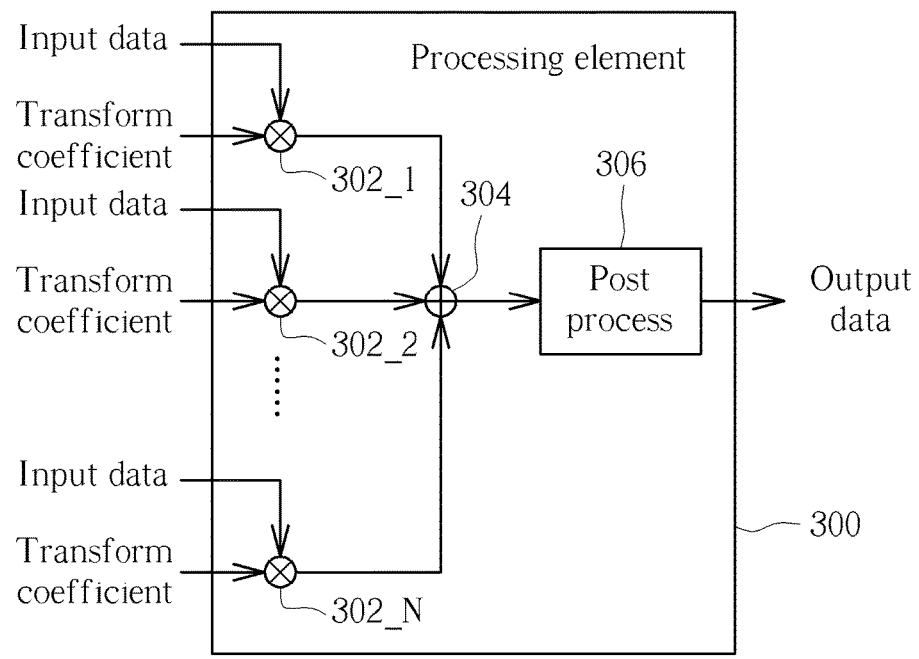
FIG. 3 is a diagram illustrating one processing element according to an embodiment of the present invention.

The second transform may be regarded as a re-transform stage after a typical transform stage (e.g., DCT) in a video encoder, and the inverse second transform may be regarded as a pre-inverse-transform stage before a typical inverse transform stage (e.g., IDCT). FIG. 2 is a diagram illustrating a residual transform kernel according to an embodiment of the present invention. The architecture of the residual transform kernel 200 may be employed to realize a second transform circuit in a video encoder or an inverse second transform circuit in a video encoder/decoder. As shown in FIG. 2, the residual transform kernel 200 includes a processing kernel 202, a look-up table (LUT) 204, and a controller 206. The controller 206 controls operations of the processing kernel 202 and the LUT 204. In one exemplary design, the processing kernel 202 can contain multiple processing elements $PE_1$-$PE_M$ used to perform arithmetic operation, where M is a positive integer. FIG. 3 is a diagram illustrating one processing element according to an embodiment of the present invention. Each of the processing elements $PE_1$-$PE_M$ shown in FIG. 2 can be implemented using the processing element 300 shown in FIG. 3. The processing element 300 includes multiple multipliers 302 1-302 N for transform-related operation, where N is a positive integer. The same input data is fed into each of the multipliers 302 1-302 N. The multipliers 302 1-302 N receives transform coefficients, and multiply the same input data with respective transform coefficients. In one exemplary design, the transform coefficients used by the multipliers 302 1-301 N can be derived from the LUT 204 maintained in a memory. As shown in FIG. 3, the processing element 300 further includes an adder 304 and a post processing circuit (denoted by "Post process") 306. Hence, the post processing circuit 306 processes the residual data after multiplication (which is done at multipliers 302 1-302 N) and addition (which is done at adder 304), thereby generating the output data. For example, the post processing circuit 306 may include post processing such as shifting, limitation or other arithmetic operation.

The present invention proposes an innovative inverse residual transform design with low cost and/or high performance and an innovative residual transform design with low cost and/or high performance for dealing with the inverse second transform and the second transform, respectively. Further details are described as below.

It should be noted that the term "circuit" mentioned hereinafter may be dedicated pure hardware for achieving the designated functionality or may be a processor running a software module for achieving the designated functionality. That is, one encoding/decoding function (e.g., a second transform function and/or an inverse second transform function) may have a hardware-based implementation or a software-based implementation, depending upon the actual design considerations.

Figure 4:
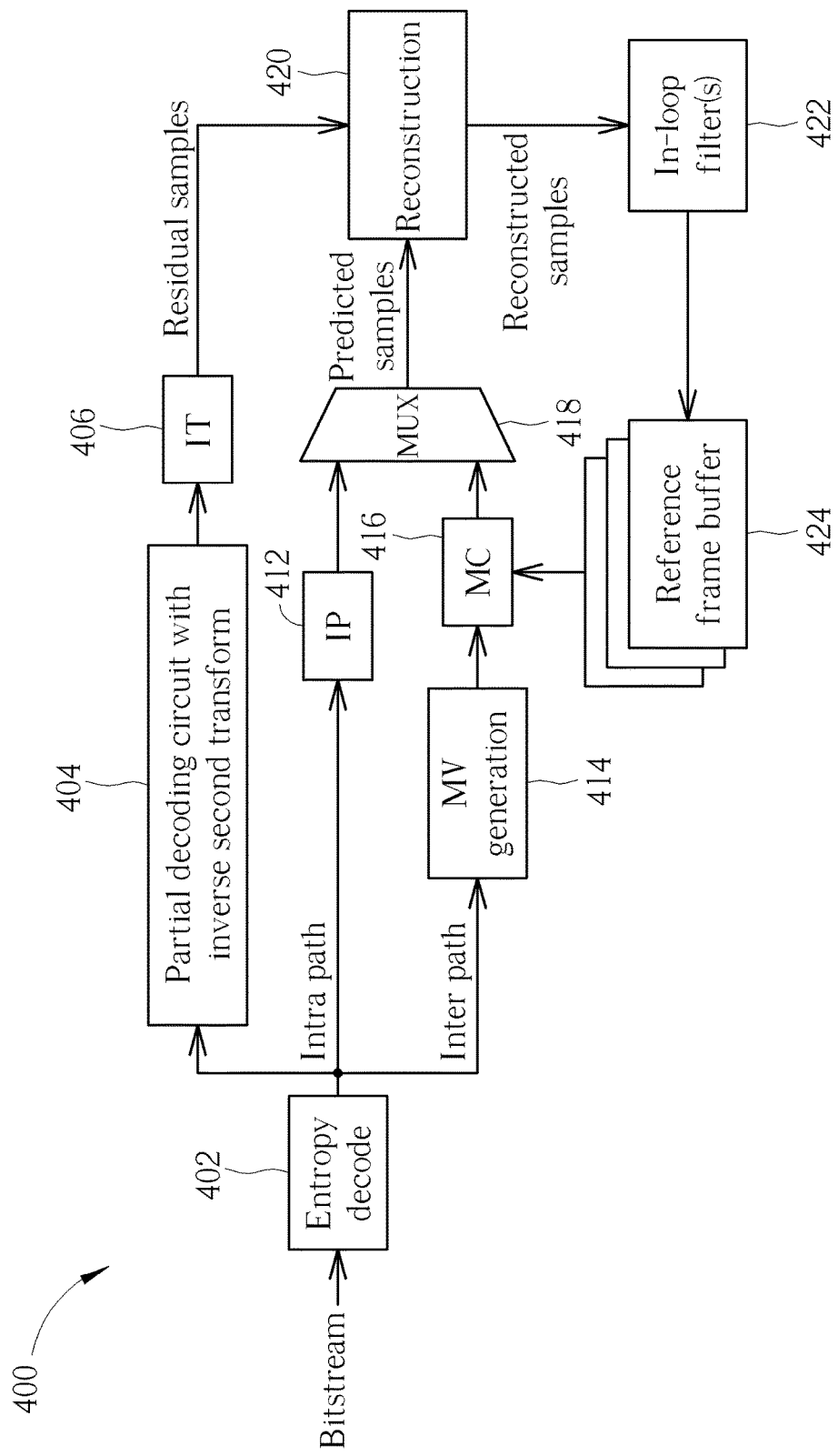
FIG. 4 is a diagram illustrating a video decoder for decoding a bitstream according to an embodiment of the present invention.

FIG. 4 is a diagram illustrating a video decoder for decoding a bitstream according to an embodiment of the present invention. The video decoder 400 has fundamental decoding components, such as an entropy decoder (denoted by "Entropy decode") 402, a partial decoding circuit with inverse second transform 404, an inverse transform circuit (denoted by "IT") 406, an intra prediction circuit (denoted by "IP" located in an intra path) 412, a motion vector generation circuit (denoted by "MV generation" located in an inter path) 414, a motion compensation circuit (denoted by "MC" located in the inter path) 416, a multiplexer (denoted by "MUX" which outputs predicted samples) 418, a reconstruction circuit (denoted by "Reconstruction" which outputs reconstructed samples) 420, one or more in-loop filters (e.g., deblocking filter, Sample adaptive offset (SAO) filter, etc.) 422, and one or more reference frame buffers 424. As shown in FIG. 4, the proposed partial decoding circuit 404 is coupled between the entropy decoder 402 and the inverse transform circuit 406. Hence, the partial decoding circuit 404 receives a residual output of a preceding circuit (i.e., an entropy decoding result from the entropy decoder 402), and generates a partial decoding result to the inverse transform 406. In this embodiment, the partial decoding circuit 404 supports at least an inverse scan function, an inverse quantization function and an inverse second transform function. In a case where the video decoder 400 complies with AVS2 coding standard, multi-stage inverse transform sequentially performs inverse second transform and typical inverse transform (e.g., inverse discrete cosine transform (IDCT)), where the inverse second transform is done at the partial decoding circuit 404, and the typical inverse transform is done at the inverse transform circuit 406. However, this is not meant to be a limitation of the present invention. Any video decoder using the proposed inverse second transform architecture with low cost and/or high performance falls within the scope of the present invention.

Figure 5:
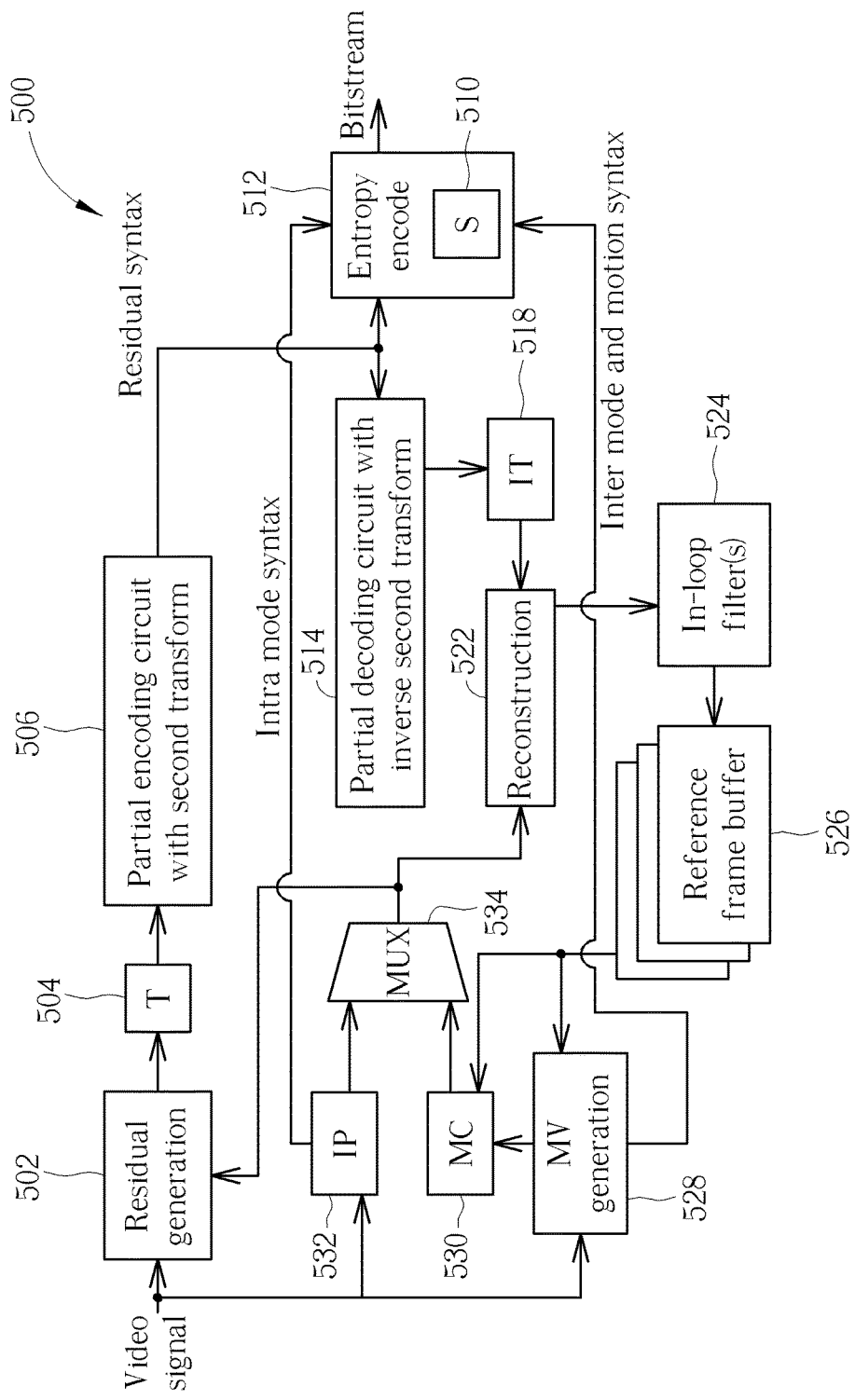
FIG. 5 is a diagram illustrating a video encoder for encoding a video signal according to an embodiment of the present invention.

FIG. 5 is a diagram illustrating a video encoder for encoding a video signal according to an embodiment of the present invention. The video encoder 500 has fundamental encoding components, such as a residual generation circuit (denoted by "Residual generation") 502, a transform circuit (denoted by "T") 504, a partial encoding circuit with second transform 506 (which outputs residual syntax), an entropy encoder (denoted by "Entropy encode" which has a scan circuit (denoted by "S") 510 included therein and outputs a bitstream) 512, a partial decoding circuit with inverse second transform 514, an inverse transform circuit (denoted by "IT") 518, a reconstruction circuit (denoted by "Reconstruction") 522, one or more in-loop filters (e.g., deblocking filter, SAO filter, etc.) 524, one or more reference frame buffers 526, a motion vector generation circuit (denoted by "MV generation" which outputs inter mode and motion syntax) 528, a motion compensation circuit (denoted by "MC") 530, an intra prediction circuit (denoted by "IP" which outputs intra mode syntax) 532, and a multiplexer (denoted by "MUX") 534.

As shown in FIG. 5, the proposed partial encoding circuit 506 is coupled between the transform circuit 504 and the entropy encoder 512, and is also coupled between the transform circuit 504 and the proposed partial decoding circuit 514. The proposed partial decoding circuit 514 is coupled between the partial encoding circuit 506 and the inverse transform circuit 518. Hence, the partial encoding circuit 506 receives a transform output of the transform circuit 504, and generates a partial encoding result to the entropy encoder 512 and the partial decoding circuit 514; and the partial decoding circuit 514 receives a residual output of a preceding circuit (e.g., a quantization output from a quantization circuit in the partial encoding circuit 506), and generates a partial decoding result to the inverse transform circuit 518. In this embodiment, the partial encoding circuit 506 supports at least a quantization function and a second transform function, and the partial decoding circuit 514 supports at least an inverse quantization function and an inverse second transform function. In a case where the video encoder 500 complies with AVS2 coding standard, multi-stage transform sequentially performs typical transform (e.g., discrete cosine transform (DCT)) and inverse second transform, and multi-stage inverse transform sequentially performs inverse second transform and typical inverse transform (e.g., inverse discrete cosine transform (IDCT)), where the second transform is done at the partial encoding circuit 506, the typical transform is done at the transform circuit 504, the inverse second transform is done at the partial decoding circuit 514, and the typical inverse transform is done at the inverse transform circuit 518. However, this is not meant to be a limitation of the present invention. Any video encoder using the proposed second transform architecture with low cost and/or high performance falls within the scope of the present invention, and any video encoder using the proposed inverse second transform architecture with low cost and/or high performance falls within the scope of the present invention.

In some embodiments of the present invention, the partial decoding circuit with inverse second transform 404/514 may be implemented using one of a plurality of proposed circuit designs to achieve low cost and/or high performance. Similarly, in some embodiments of the present invention, the partial encoding circuit with second transform. 506 may be implemented using one of a plurality of proposed circuit designs to achieve low cost and/or high performance. The proposed circuit designs for inverse second transform in a video encoder/decoder and the proposed circuit designs for second transform in a video encoder are detailed as below.

Figure 6:
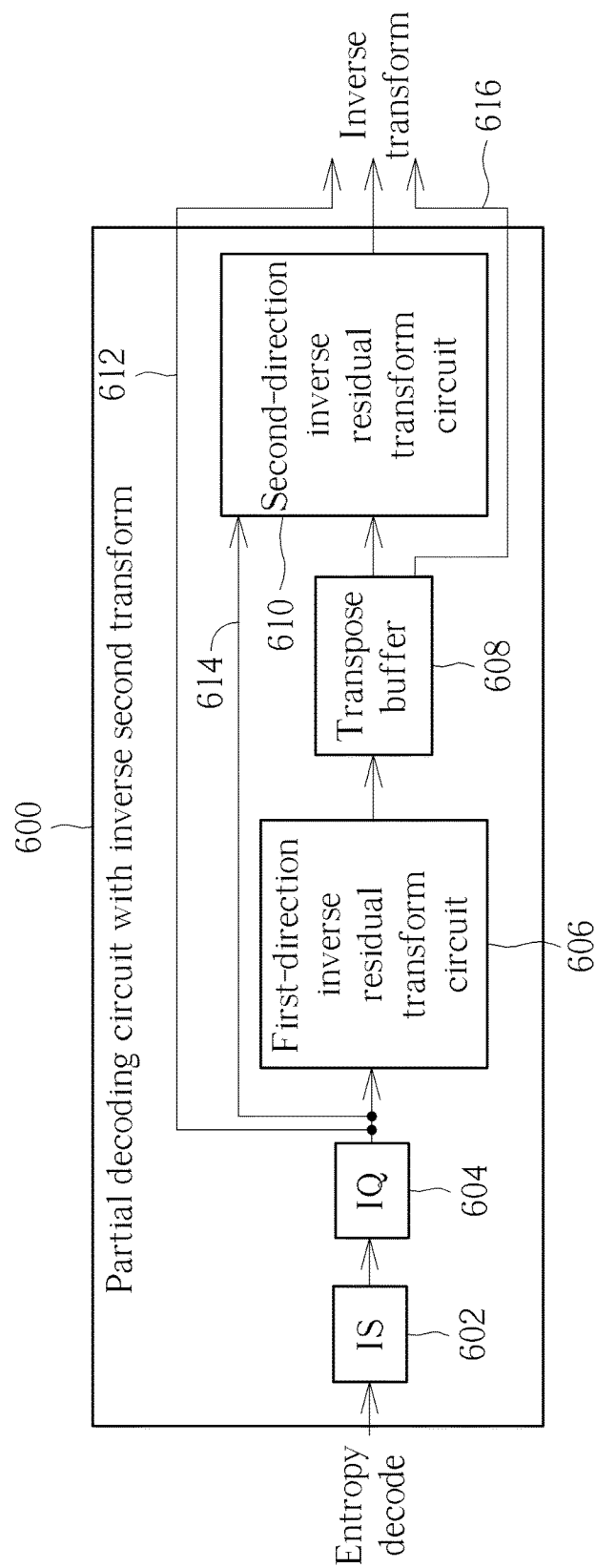
FIG. 6 is a diagram illustrating a partial decoding circuit with high-performance inverse second transform according to an embodiment of the present invention.

FIG. 6 is a diagram illustrating a partial decoding circuit with high-performance inverse second transform according to an embodiment of the present invention. The partial decoding circuit 404 in the video decoder 400 may be implemented using the partial decoding circuit 600. The partial decoding circuit 600 includes an inverse scan circuit (denoted by "IS") 602, an inverse quantization circuit (denoted by "IQ") 604, a first-direction inverse residual transform circuit 606, a transpose buffer 608, a second-direction inverse residual transform circuit 610, and a plurality of bypass paths 612, 614, 616. The inverse scan circuit 602 is arranged to process a residual output of a preceding circuit and generate an inverse scan output, where the preceding circuit may be an entropy decoder (e.g., entropy decoder 402 shown in FIG. 4) if the partial decoding circuit 600 is implemented in a video decoder. The inverse quantization circuit 604 processes the inverse scan output of the inverse scan circuit 602 to generate an inverse quantization output.

The first-direction inverse residual transform circuit 606, the transpose buffer 608, and the second-direction inverse residual transform circuit 610 may be regarded as an inverse second transform circuit. Each of the first-direction inverse residual transform circuit 606 and the second-direction inverse residual transform circuit 610 may be implemented using the architecture of the residual transform kernel 200 shown in FIG. 2. The transpose buffer 608 is arranged to store an intermediate inverse residual transform result of the inverse second transform. The first-direction inverse residual transform circuit 606 is arranged to process the inverse quantization output of the inverse quantization circuit 604 to generate the intermediate inverse residual transform result to the transpose buffer 608. The second-direction inverse residual transform circuit 610 is arranged to access the transpose buffer 608 to retrieve the intermediate inverse residual transform result, and process the intermediate inverse residual transform result to generate a final inverse residual transform result of the inverse second transform. The final inverse residual transform result of the inverse second transform is generated to an inverse transform circuit (e.g., inverse transform circuit 406 shown in FIG. 4. In other words, the final inverse residual transform result of the inverse second transform is further processed by an inverse transform circuit.

In one exemplary design, the first-direction inverse residual transform circuit 606 may be an inverse horizontal residua transform circuit, and the second-direction inverse residual transform circuit 610 may be an inverse vertical residual transform circuit. In another exemplary design, the first-direction inverse residual transform circuit 606 may be an inverse vertical residual transform circuit, and the second-direction inverse residual transform circuit 610 may be an inverse horizontal residual transform circuit.

As mentioned above, the first-direction inverse residual transform circuit 606 is arranged to perform inverse transform in a first direction, and the second-direction inverse residual transform circuit 610 is arranged to perform inverse transform in a second direction that is different from the first direction. For example, the first-direction inverse residual transform generates the inverse transform result in a column-by-column manner. However, the second-direction inverse residual transform is performed in a row-by-row manner. Hence, the transpose buffer 608 is used to correctly provide the data needed by the second-direction inverse residual transform. For example, supposing that the first-direction inverse residual transform generates the inverse transform result in a column-by-column manner, the first-direction inverse residual transform may store the inverse transform result into the transpose buffer 608 in a column-by-column manner, and the second-direction inverse residual transform may perform transpose access upon the transpose buffer 608 to retrieve stored data in a row-by-row manner. For another example, supposing that the first-direction inverse residual transform generates the inverse transform result in a column-by-column manner, the first-direction inverse residual transform may perform transpose access to store the inverse transform result into the transpose buffer 608 in a row-by-row manner, and the second-direction inverse residual transform may retrieve stored data from the transpose buffer 608 in the row-by-row manner. However, these are for illustrative purposes only, and are not meant to be limitations of the present invention.

In this embodiment, the partial decoding circuit 600 employs a high-performance inverse residual transform design that has two separate circuits (i.e., first-direction inverse residual transform circuit 606 and second-direction inverse residual transform circuit 610) for supporting parallel processing of inverse horizontal transform and inverse vertical transform. For example, the first-direction inverse residual transform circuit 606 and the second-direction inverse residual transform circuit 610 may process partial residual transform data of different PUs in a parallel processing manner.

Figure 7:
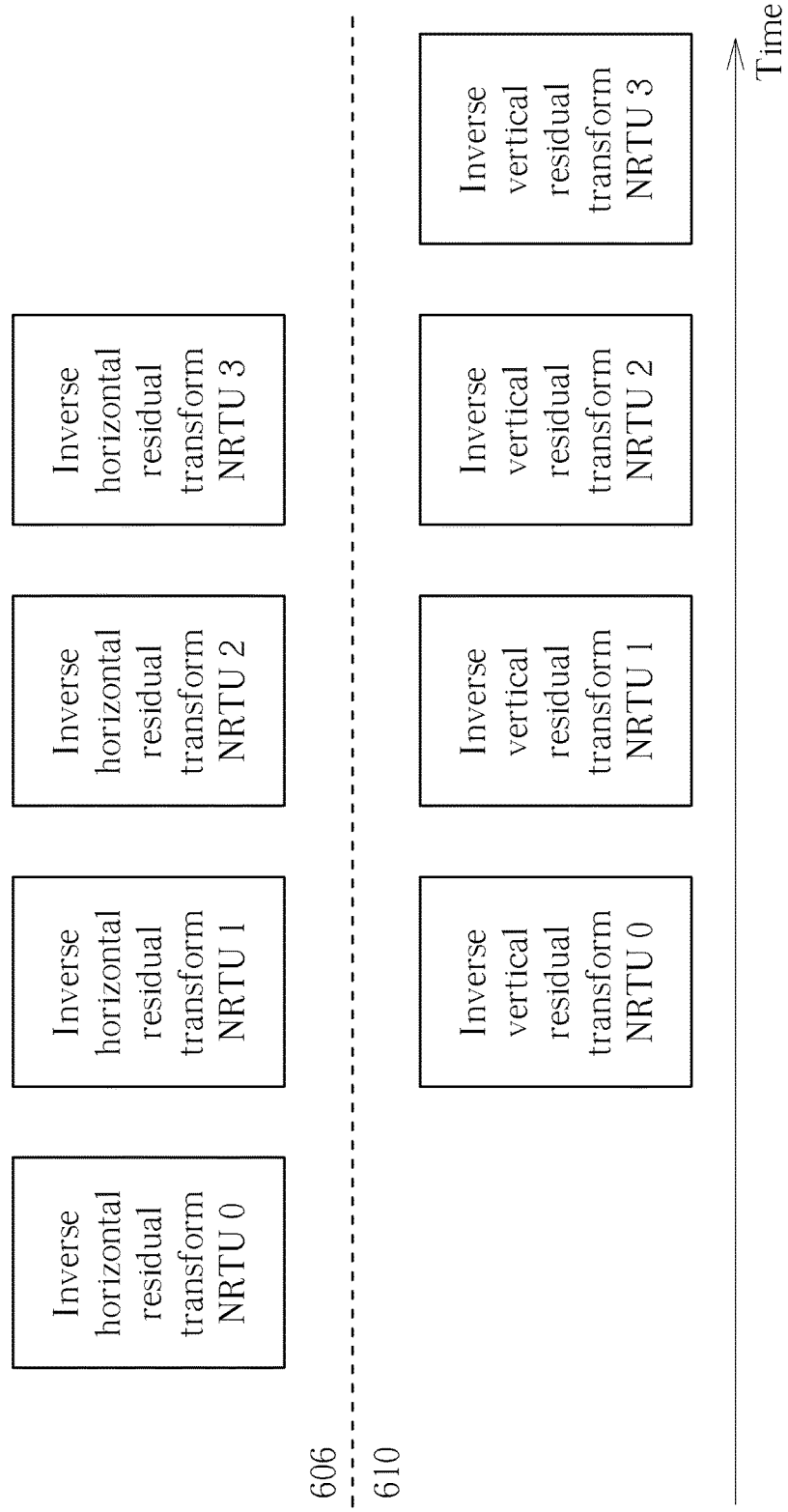
FIG. 7 is a diagram illustrating parallel processing of horizontal and vertical inverse transform according to an embodiment of the present invention.

FIG. 7 is a diagram illustrating parallel processing of horizontal and vertical inverse transform according to an embodiment of the present invention. Suppose that the first-direction inverse residual transform circuit 606 is arranged to perform inverse horizontal residual transform, and the second-direction inverse residual transform circuit 610 is arranged to perform inverse vertical residual transform. After the first-direction inverse residual transform circuit 606 performs inverse horizontal residual transform upon NRTU of PU 0 (denoted by "NRTU 0"), the second-direction inverse residual transform circuit 610 performs inverse vertical residual transform upon NRTU of PU 0 (denoted by "NRTU 0"). At this moment, the first-direction inverse residual transform circuit 606 performs inverse horizontal residual transform upon NRTU of PU 1 (denoted by "NRTU 1"). In other words, when the first-direction inverse residual transform circuit 606 performs inverse horizontal residual transform upon NRTU of PU 1 (denoted by "NRTU 1"), the second-direction inverse residual transform circuit 606 performs inverse vertical residual transform upon NRTU of PU 0 (denoted by "NRTU 0"). Similarly, after the first-direction inverse residual transform circuit 606 performs inverse horizontal residual transform upon NRTU of PU 1 (denoted by "NRTU 1"), the second-direction inverse residual transform circuit 610 performs inverse vertical residual transform upon NRTU of PU 1 (denoted by "NRTU 1"). At this moment, the first-direction inverse residual transform circuit 606 performs inverse horizontal residual transform upon NRTU of PU 2 (denoted by "NRTU 2"). In other words, when the first-direction inverse residual transform circuit 606 performs inverse horizontal residual transform upon NRTU of PU 2 (denoted by "NRTU 2"), the second-direction inverse residual transform circuit 606 performs inverse vertical residual transform upon NRTU of PU 1 (denoted by "NRTU 1"). In this way, the first-direction inverse residual transform circuit 606 and the second-direction inverse residual transform circuit 610 perform parallel processing of inverse horizontal and vertical transform for NRTUs in different PUs. In other words, the processing time of inverse horizontal transform of residual transform data associated with NRTU in one PU is overlapped with the processing time of inverse vertical transform of residual transform data associated with NRTU in another PU.

In a case where the residual transform data in one PU require inverse second transform including both of inverse horizontal residual transform and inverse vertical residual transform, the residual transform data are processed by the first-direction inverse residual transform circuit (e.g., inverse horizontal residual transform circuit) 606 and the second-direction inverse residual transform circuit (e.g., inverse vertical residual transform circuit) 610. However, when the residual transform data in one PU are not required to be processed by one or both of inverse horizontal residual transform and inverse vertical residual transform, one of the bypass paths 612, 614, 616 can be used to transmit the residual transform data. As shown in FIG. 6, the bypass path 612 is coupled between an output of the inverse quantization circuit 604 and an input of the inverse transform circuit (e.g., inverse transform circuit 406 shown in FIG. 4), the bypass path 614 is coupled between the output of the inverse quantization circuit 604 and an input of the second-direction inverse residual transform circuit 610, and the bypass path 616 is coupled between an output of the transpose buffer 608 and the input of the inverse transform circuit (e.g., inverse transform circuit 406 shown in FIG. 4). In a first case where the residual transform data in one PU (e.g., an NNRTU of one PU) are not required to be processed by both of first-direction inverse residual transform circuit 606 and second-direction inverse residual transform circuit 610, the bypass path 612 is selected and used to transmit the residual transform data to thereby bypass first-direction inverse residual transform circuit 606 and second-direction inverse residual transform circuit 610. In a second case where the residual transform data in one PU are not required to be processed by first-direction inverse residual transform circuit 606, the bypass path 614 is selected and used to transmit the residual transform data to thereby bypass first-direction inverse residual transform circuit 606. In a third case where the residual transform data in one PU are not required to be processed by second-direction inverse residual transform circuit 610, the bypass path 616 is selected and used to transmit the residual transform data to thereby bypass second-direction inverse residual transform circuit 610.

Figure 8:
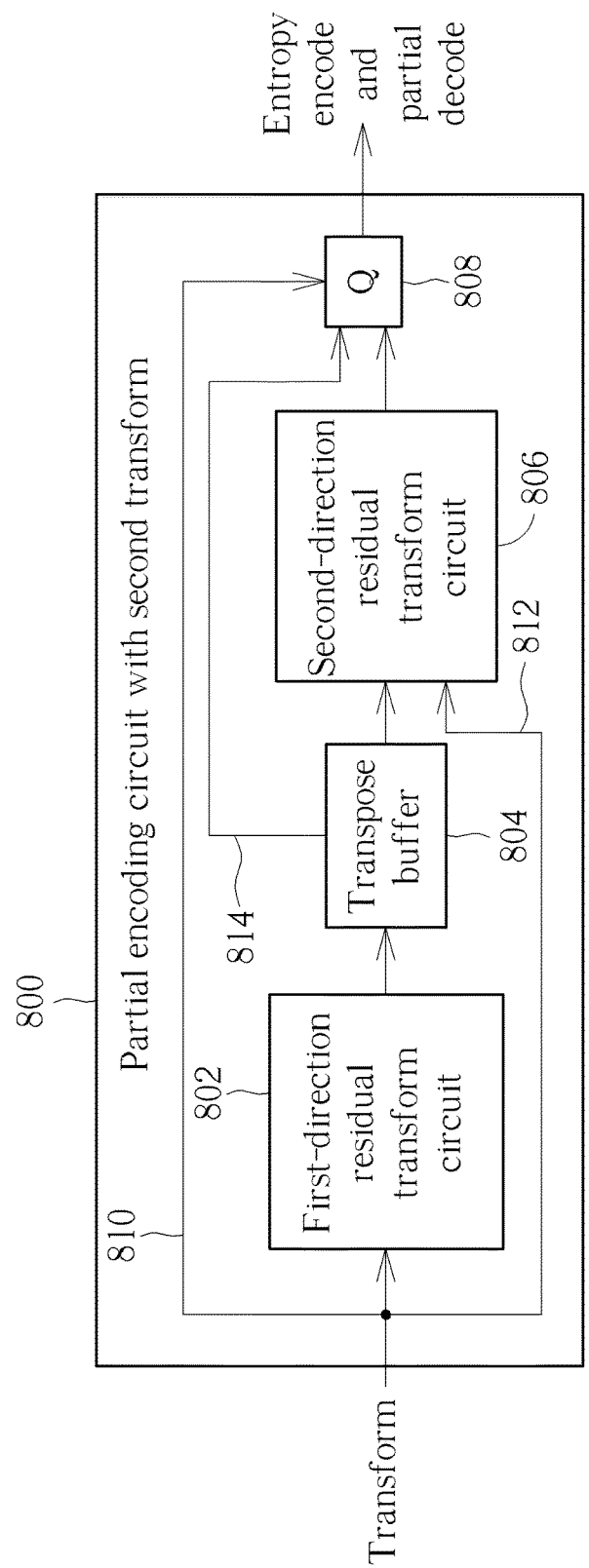
FIG. 8 is a diagram illustrating a partial encoding circuit with high-performance second transform according to an embodiment of the present invention.

FIG. 8 is a diagram illustrating a partial encoding circuit with high-performance second transform according to an embodiment of the present invention. The partial encoding circuit 506 in the video encoder 500 may be implemented using the partial encoding circuit 800. The partial encoding circuit 800 includes a first-direction residual transform circuit 802, a transpose buffer 804, a second-direction residual transform circuit 806, a quantization circuit 808, and a plurality of bypass paths 810, 812, 814. The first-direction residual transform circuit 802, the transpose buffer 804, and the second-direction residual transform circuit 806 may be regarded as a second transform circuit. Each of the first-direction residual transform circuit 802 and the second-direction residual transform circuit 806 may be implemented using the architecture of the residual transform kernel 200 shown in FIG. 2. The transpose buffer 804 is arranged to store an intermediate residual transform result of the second transform. The first-direction residual transform circuit 802 is arranged to process a residual output of a preceding circuit (e.g., a transform output of the transform circuit 504) to generate the intermediate residual transform result to the transpose buffer 804. The second-direction residual transform circuit 806 is arranged to access the transpose buffer 804 to retrieve the intermediate residual transform result, and process the intermediate residual transform result to generate a final residual transform result of the second transform. The quantization circuit 808 processes the final residual transform result of the second transform to generate a quantization output to a following circuit (e.g., entropy encoder 512 and partial decoding circuit 514 shown in FIG. 5).

In one exemplary design, the first-direction residual transform circuit 802 may be a vertical residua transform circuit, and the second-direction residual transform circuit 806 may be a horizontal residual transform circuit. In another exemplary design, the first-direction residual transform circuit 802 may be a horizontal residual transform circuit, and the second-direction residual transform circuit 806 may be a vertical residual transform circuit.

As mentioned above, the first-direction residual transform circuit 802 is arranged to perform transform in a first direction, and the second-direction residual transform circuit 806 is arranged to perform transform in a second direction that is different from the first direction. For example, the first-direction residual transform generates the transform result in a column-by-column manner. However, the second-direction residual transform is performed in a row-by-row manner. Hence, the transpose buffer 804 is used to correctly provide the data needed by the second-direction residual transform. For example, supposing that the first-direction residual transform generates the transform result in a column-by-column manner, the first-direction residual transform may store the transform result into the transpose buffer 804 in a column-by-column manner, and the second-direction residual transform may perform transpose access upon the transpose buffer 804 to retrieve stored data in a row-by-row manner. For another example, supposing that the first-direction residual transform generates the transform result in a column-by-column manner, the first-direction residual transform may perform transpose access to store the transform result into the transpose buffer 804 in a row-by-row manner, and the second-direction residual transform may retrieve stored data from the transpose buffer 804 in the row-by-row manner. However, these are for illustrative purposes only, and are not meant to be limitations of the present invention.

In this embodiment, the partial encoding circuit 800 employs a high-performance residual transform design that has two separate circuits (i.e., first-direction residual transform circuit 802 and second-direction residual transform circuit 806) for supporting parallel processing of horizontal transform and vertical transform. For example, the first-direction residual transform circuit 802 and the second-direction residual transform circuit 806 may process partial residual transform data of different PUs in a parallel processing manner.

Figure 9:
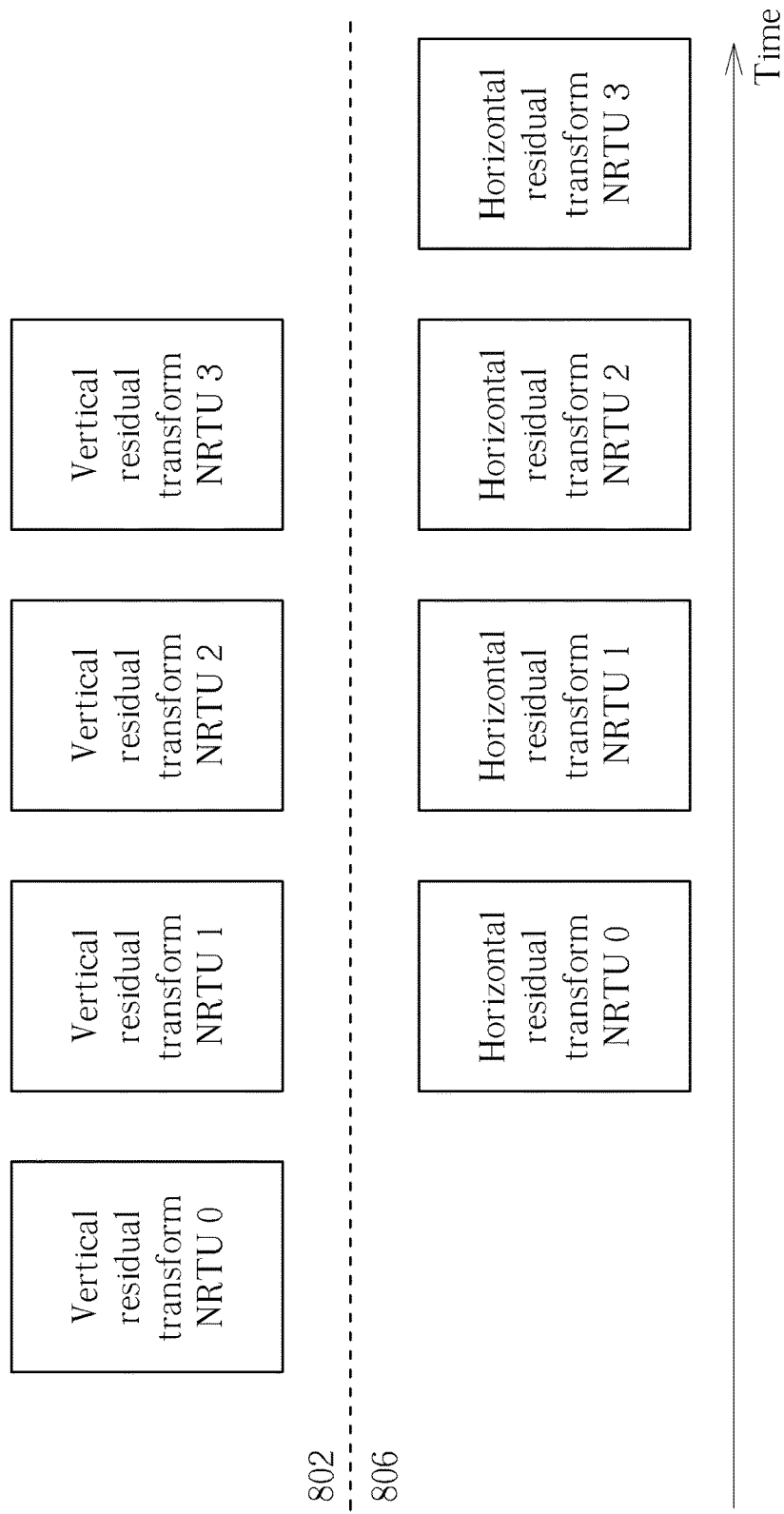
FIG. 9 is a diagram illustrating parallel processing of horizontal and vertical transform according to an embodiment of the present invention.

FIG. 9 is a diagram illustrating parallel processing of horizontal and vertical transform according to an embodiment of the present invention. Suppose that the first-direction residual transform circuit 802 is arranged to perform vertical residual transform, and the second-direction residual transform circuit 806 is arranged to perform horizontal residual transform. Hence, after the first-direction residual transform circuit 802 performs vertical residual transform upon NRTU of PU 0 (denoted by "NRTU 0"), the second-direction residual transform circuit 806 performs horizontal residual transform upon NRTU of PU 0 (denoted by "NRTU 0"). At this moment, the first-direction residual transform circuit 802 performs vertical residual transform upon NRTU of PU 1 (denoted by "NRTU 1"). In other words, when the first-direction residual transform circuit 802 performs vertical residual transform upon NRTU of PU 1 (denoted by "NRTU 1"), the second-direction residual transform circuit 806 performs horizontal residual transform upon NRTU of PU 0 (denoted by "NRTU 0"). Similarly, after the first-direction residual transform circuit 802 performs vertical residual transform upon NRTU of PU 1 (denoted by "NRTU 1"), the second-direction residual transform circuit 806 performs horizontal residual transform upon NRTU of PU 1 (denoted by "NRTU 1"). At this moment, the first-direction residual transform circuit 802 performs vertical residual transform upon NRTU of PU 2 (denoted by "NRTU 2"). In other words, when the first-direction residual transform circuit 802 performs vertical residual transform upon NRTU of PU 2 (denoted by "NRTU 2"), the second-direction residual transform circuit 806 performs horizontal residual transform upon NRTU of PU 1 (denoted by "NRTU 1"). In this way, the first-direction residual transform circuit 802 and the second-direction residual transform circuit 806 perform parallel processing of vertical and horizontal for NRTUs in different PUs. In other words, the processing time of vertical transform of residual transform data associated with NRTU in one PU is overlapped with the processing time of horizontal transform of residual transform data associated with NRTU in another PU.

In a case where the residual transform data in one PU require second transform including both of vertical residual transform and horizontal residual transform, the residual transform data are processed by the first-direction residual transform circuit (e.g., vertical residual transform circuit) 802 and the second-direction residual transform circuit (e.g., horizontal residual transform circuit) 806. However, when the residual transform data in one PU are not required to be processed by one or both of vertical residual transform and horizontal residual transform, one of the bypass paths 810, 812, 814 can be used to transmit the residual transform data.

As shown in FIG. 8, the bypass path 810 is coupled between an output of a transform circuit (e.g., transform circuit 504 shown in FIG. 5) and an input of the quantization circuit 808, the bypass path 812 is coupled between the output of the transform circuit (e.g., transform circuit 504 shown in FIG. 5) and an input of the second-direction residual transform circuit 806, and the bypass path 814 is coupled between an output of the transpose buffer 804 and the input of the quantization circuit 808. In a first case where the residual transform data in one PU (e.g., NNRTU of one PU) are not required to be processed by both of first-direction residual transform circuit 802 and second-direction residual transform circuit 806, the bypass path 810 is selected and used to transmit the residual transform data to thereby bypass first-direction residual transform circuit 802 and second-direction residual transform circuit 806. In a second case where the residual transform data in one PU are not required to be processed by first-direction residual transform circuit 802, the bypass path 812 is selected and used to transmit the residual transform data to thereby bypass first-direction residual transform circuit 802. In a third case where the residual transform data in one PU are not required to be processed by second-direction residual transform circuit 806, the bypass path 814 is selected and used to transmit the residual transform data to thereby bypass second-direction residual transform circuit 806.

Figure 10:
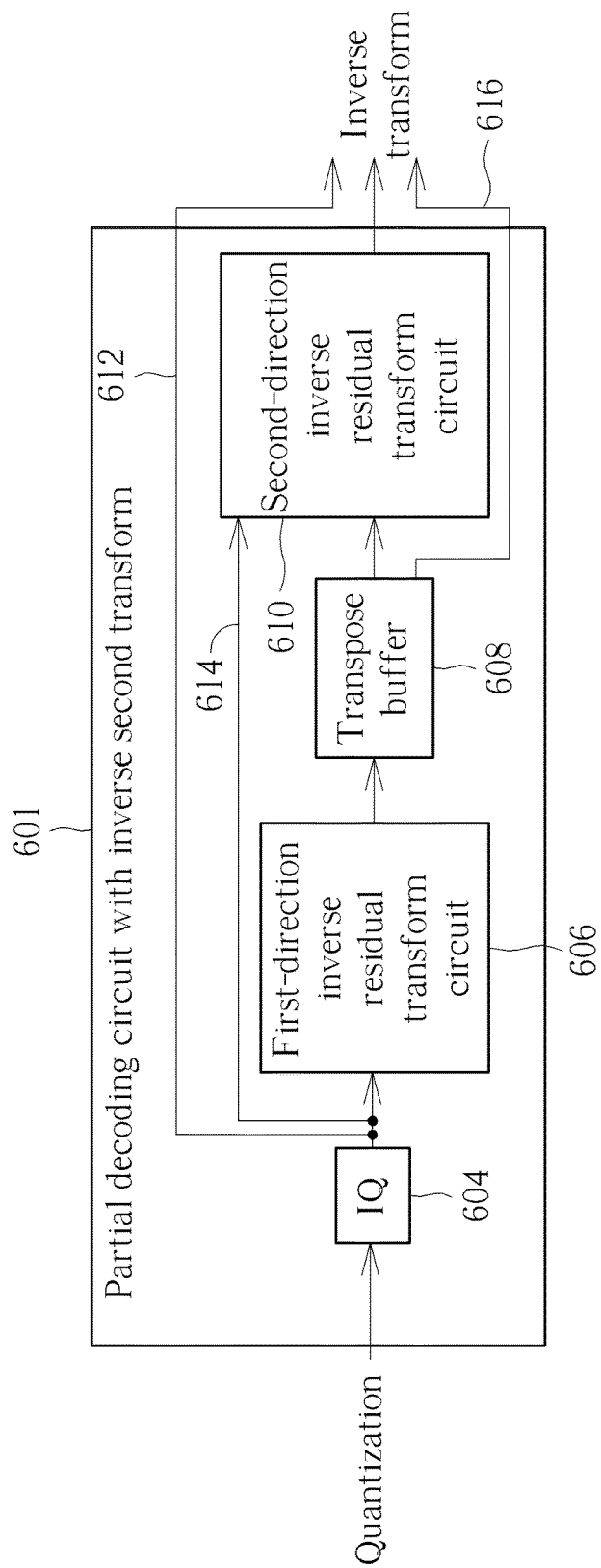
FIG. 10 is a diagram illustrating another partial decoding circuit with high-performance inverse second transform according to an embodiment of the present invention.

FIG. 10 is a diagram illustrating another partial decoding circuit with high-performance inverse second transform according to an embodiment of the present invention. The partial decoding circuit 514 in the video decoder 500 may be implemented using the partial decoding circuit 601. The partial decoding circuit 601 shown in FIG. 10 may be constructed by omitting the inverse scan circuit 602 in the partial decoding circuit 600 shown in FIG. 6. The partial decoding circuit 601 is arranged to process a residual output of a preceding circuit and generate a partial decoding result to a following circuit, where the preceding circuit may be the partial encoding circuit 506 (particularly, a quantization circuit in the partial encoding circuit 506) and the following circuit may be the inverse transform circuit 518 if the partial decoding circuit 601 is implemented in the video encoder 500. As a person skilled in the art can readily understand details of the partial decoding circuit 601 after reading above paragraphs directed to the partial decoding circuit 600, further description is omitted here for brevity.

Figure 11:
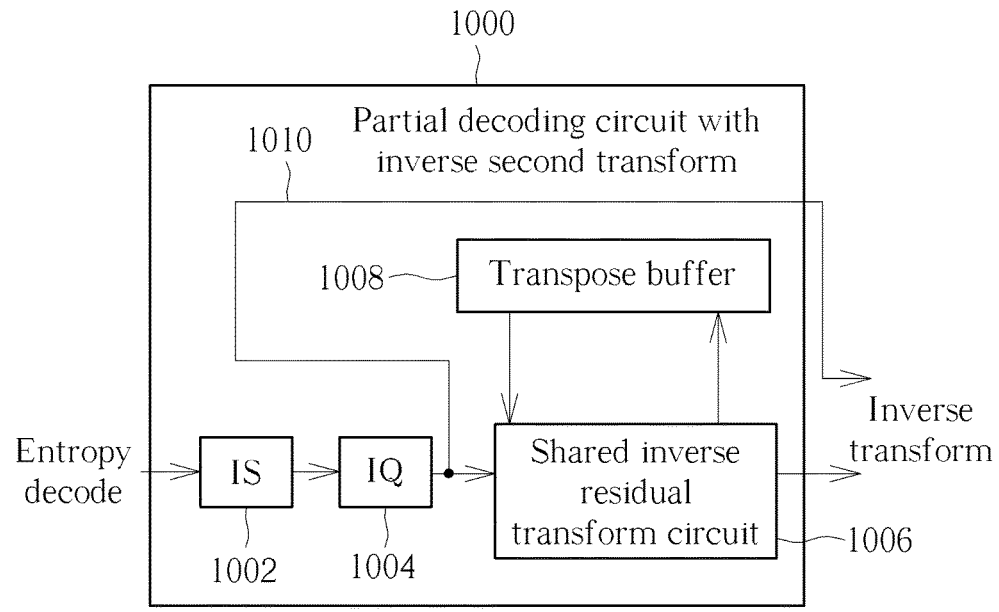
FIG. 11 is a diagram illustrating a partial decoding circuit with low-cost inverse second transform according to an embodiment of the present invention.

FIG. 11 is a diagram illustrating a partial decoding circuit with low-cost inverse second transform according to an embodiment of the present invention. The partial decoding circuit 404 in the video decoder 400 may be implemented using the partial decoding circuit 1000. The partial decoding circuit 1000 includes an inverse scan circuit (denoted by "IS") 1002, an inverse quantization circuit (denoted by "IQ") 1004, a shared inverse residual transform circuit 1006, a transpose buffer 1008, and a bypass path 1010. The shared inverse residual transform circuit 1006 and the transpose buffer 1008 may be regarded as an inverse second transform circuit. The transpose buffer 1008 is arranged to store an intermediate inverse residual transform result of the inverse second transform. The shared inverse residual transform circuit 1006 may be implemented using the architecture of the residual transform kernel 200 shown in FIG. 2. In this embodiment, the shared inverse residual transform circuit 1006 is arranged to employ a same processing kernel (e.g., processing kernel 202 shown in FIG. 2) to perform a first-direction inverse residual transform operation and a second-direction inverse residual transform operation. For example, the first-direction inverse residual transform operation and the second-direction inverse residual transform operation may have the same inverse residual transform algorithm but different residual data inputs. Hence, the processing kernel of the shared inverse residual transform circuit 1006 may be used to perform the first-direction inverse residual transform operation and then may be re-used to perform the second-direction inverse residual transform operation.

The first-direction inverse residual transform operation processes an inverse quantization output of the inverse quantization circuit 1004 to generate the intermediate inverse residual transform result of the inverse second transform to the transpose buffer 1008, and the second-direction inverse residual transform operation accesses the transpose buffer 1008 to retrieve the intermediate inverse residual transform result, and processes the intermediate inverse residual transform result to generate a final inverse residual transform result of the inverse second transform. The final inverse residual transform result is generated from the shared inverse residual transform circuit 1006 to a following circuit (e.g., inverse transform circuit 406 shown in FIG. 4) for further processing.

In one exemplary design, the first-direction inverse residual transform operation may be inverse horizontal transform, and the second-direction inverse residual transform operation may be inverse vertical transform. In another exemplary design, the first-direction inverse residual transform operation may be inverse vertical transform, and the second-direction inverse residual transform operation may be inverse horizontal transform.

As mentioned above, the first-direction inverse residual transform operates in a first direction, and the second-direction inverse residual transform operates in a second direction that is different from the first direction. For example, the first-direction inverse residual transform generates the inverse transform result in a column-by-column manner. However, the second-direction inverse residual transform is performed in a row-by-row manner. Hence, the transpose buffer 1008 is used to correctly provide the data needed by the second-direction inverse residual transform. For example, supposing that the first-direction inverse residual transform generates the inverse transform result in a column-by-column manner, the first-direction inverse residual transform may store the inverse transform result into the transpose buffer 1008 in a column-by-column manner, and the second-direction inverse residual transform may perform transpose access upon the transpose buffer 1008 to retrieve stored data in a row-by-row manner. For another example, supposing that the first-direction inverse residual transform generates the inverse transform result in a column-by-column manner, the first-direction inverse residual transform may perform transpose access to store the inverse transform result into the transpose buffer 1008 in a row-by-row manner, and the second-direction inverse residual transform may retrieve stored data from the transpose buffer 1008 in the row-by-row manner. However, these are for illustrative purposes only, and are not meant to be limitations of the present invention.

The partial decoding circuit 1000 employs a low-cost inverse second transform design that uses a single processing kernel to support inverse residual transform in two directions. Specifically, the low-cost inverse residual transform design uses a processing kernel to deal with the first-direction inverse residual transform operation and then re-uses the same processing kernel to deal with the second-direction inverse residual transform operation.

In a case where the residual transform data in one PU require inverse second transform including one or both of inverse vertical residual transform and inverse horizontal residual transform, the residual transform data are processed by one or both of the first-direction inverse residual transform operation and the second-direction inverse residual transform operation performed by the shared inverse residual transform circuit 1006. However, when the residual transform data in one PU (e.g., NNRTU of one PU) are not required to be processed by both of inverse vertical residual transform and inverse horizontal residual transform, the bypass path 1010 can be used to transmit the residual transform data. As shown in FIG. 11, the bypass path 1010 is coupled between an output of the inverse quantization circuit 1004 and an input of an inverse transform circuit (e.g., inverse transform circuit 406 in FIG. 4). When the residual transform data in one PU are not required to be processed by both of first-direction inverse residual transform operation and second-direction inverse residual transform operation, the bypass path 1010 is selected and used to transmit the residual transform data to thereby bypass the shared inverse residual transform circuit 1006.

Figure 12:
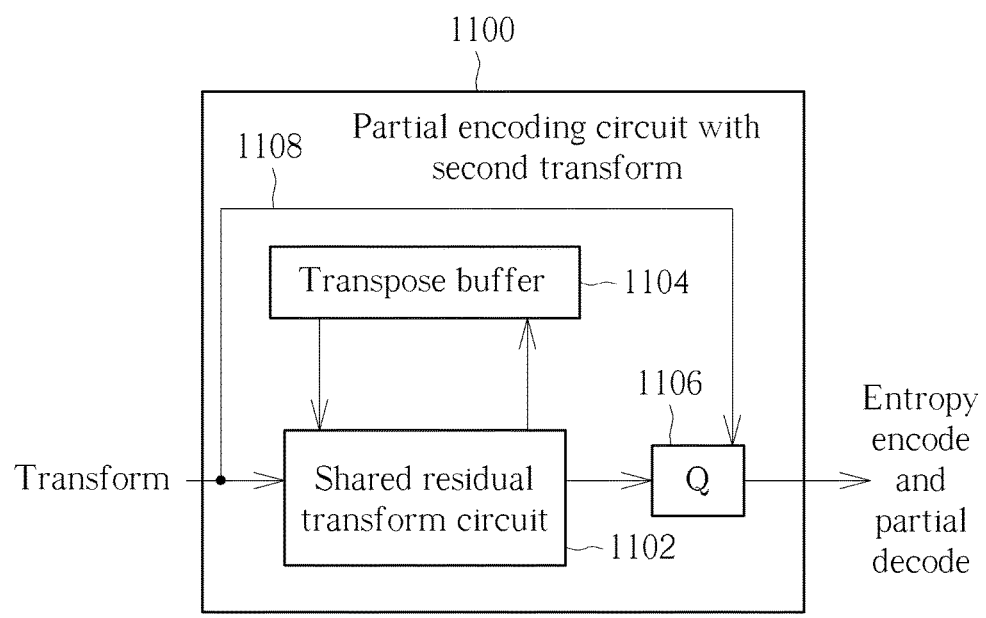
FIG. 12 is a diagram illustrating a partial encoding circuit with low-cost second transform according to an embodiment of the present invention.

FIG. 12 is a diagram illustrating a partial encoding circuit with low-cost second transform according to an embodiment of the present invention. The partial encoding circuit 506 in the video encoder 500 may be implemented using the partial encoding circuit 1100. The partial encoding circuit 1100 includes a shared residual transform circuit 1102, a transpose buffer 1104, and a quantization circuit (denoted by "Q") 1106. The shared residual transform circuit 1102 and the transpose buffer 1104 may be regarded as a second transform circuit. The transpose buffer 1104 is arranged to store an intermediate residual transform result of the second transform. The shared residual transform circuit 1102 may be implemented using the architecture of the residual transform kernel 200 shown in FIG. 2. In this embodiment, the shared residual transform circuit 1102 is arranged to employ a same processing kernel (e.g., processing kernel 202 shown in FIG. 2) to perform a first-direction residual transform operation and a second-direction residual transform operation. For example, the first-direction residual transform operation and the second-direction residual transform operation may have the same residual transform algorithm but different residual data inputs. Hence, the processing kernel of the shared residual transform circuit 1102 may be used to perform the first-direction residual transform operation and then may be re-used to perform the second-direction residual transform operation.

The first-direction residual transform operation processes a transform output of a preceding circuit (e.g., transform circuit 504 shown in FIG. 5) to generate the intermediate residual transform result of the second transform to the transpose buffer 1104, and the second-direction residual transform operation accesses the transpose buffer 1104 to retrieve the intermediate residual transform result, and processes the intermediate residual transform result to generate a final residual transform result of the second transform. The quantization circuit 1106 processes the final residual transform result to generate a quantization output to a following circuit (e.g., entropy encoder 512 and partial decoding circuit 514 shown in FIG. 5). In one exemplary design, the first-direction residual transform operation may be vertical transform, and the second-direction residual transform operation may be horizontal transform. In another exemplary design, the first-direction residual transform operation may be horizontal transform, and the second-direction residual transform operation may be vertical transform.

As mentioned above, the first-direction residual transform operates in a first direction, and the second-direction residual transform operates in a second direction that is different from the first direction. For example, the first-direction residual transform generates the transform result in a column-by-column manner. However, the second-direction residual transform is performed in a row-by-row manner. Hence, the transpose buffer 1104 is used to correctly provide the data needed by the second-direction residual transform. For example, supposing that the first-direction residual transform generates the transform result in a column-by-column manner, the first-direction residual transform may store the transform result into the transpose buffer 1104 in a column-by-column manner, and the second-direction residual transform may perform transpose access upon the transpose buffer 1104 to retrieve stored data in a row-by-row manner. For another example, supposing that the first-direction residual transform generates the transform result in a column-by-column manner, the first-direction residual transform may perform transpose access to store the transform result into the transpose buffer 1104 in a row-by-row manner, and the second-direction residual transform may retrieve stored data from the transpose buffer 1104 in the row-by-row manner. However, these are for illustrative purposes only, and are not meant to be limitations of the present invention.

The partial encoding circuit 1100 employs a low-cost second transform design that uses a single processing kernel to support residual transform in two directions. Specifically, the low-cost residual transform design uses a processing kernel to deal with the first-direction residual transform operation and then re-uses the same processing kernel to deal with the second-direction residual transform operation.

In a case where the residual transform data in one PU require second transform including one or both of vertical residual transform and horizontal residual transform, the residual transform data are processed by one or both of the first-direction residual transform operation and the second-direction residual transform operation performed by the shared residual transform circuit 1102. However, when the residual transform data in one PU (e.g., NNRTU of one PU) are not required to be processed by both of vertical residual transform and horizontal residual transform, the bypass path 1108 can be used to transmit the residual transform data. As shown in FIG. 12, the bypass path 1108 is coupled between an output of a transform circuit (e.g., transform circuit 504 shown in FIG. 5) and an input of the quantization circuit 1106. When the residual transform data in one PU are not required to be processed by both of first-direction residual transform operation and second-direction residual transform operation, the bypass path 1108 is selected and used to transmit the residual transform data to thereby bypass the shared residual transform circuit 1102.

Figure 13:
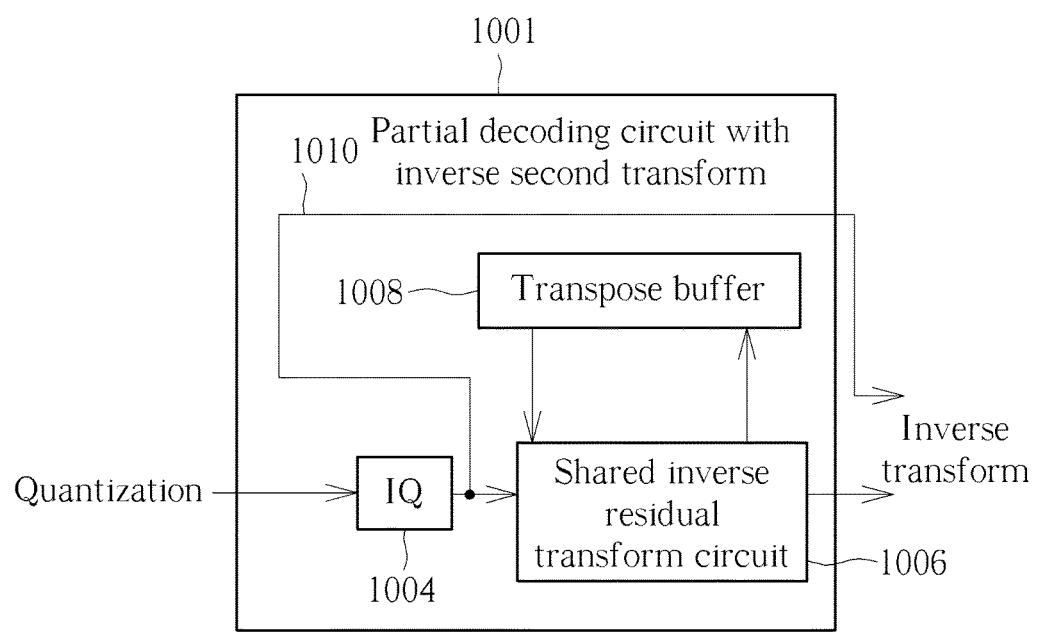
FIG. 13 is a diagram illustrating another partial decoding circuit with low-cost inverse second transform according to an embodiment of the present invention.

FIG. 13 is a diagram illustrating another partial decoding circuit with low-cost inverse second transform according to an embodiment of the present invention. The partial decoding circuit 514 in the video decoder 500 may be implemented using the partial decoding circuit 1001. The partial decoding circuit 1001 shown in FIG. 13 may be constructed by omitting the inverse scan circuit 1002 in the partial decoding circuit 1000 shown in FIG. 11. The partial decoding circuit 1001 is arranged to process a residual output of a preceding circuit and generate a partial decoding result to a following circuit, where the preceding circuit may be the partial encoding circuit 506 (particularly, a quantization circuit in the partial encoding circuit 506) and the following circuit may be the inverse transform circuit 518 if the partial decoding circuit 1001 is implemented in the video encoder 500. As a person skilled in the art can readily understand details of the partial decoding circuit 1001 after reading above paragraphs directed to the partial decoding circuit 1000, further description is omitted here for brevity.

Figure 14:
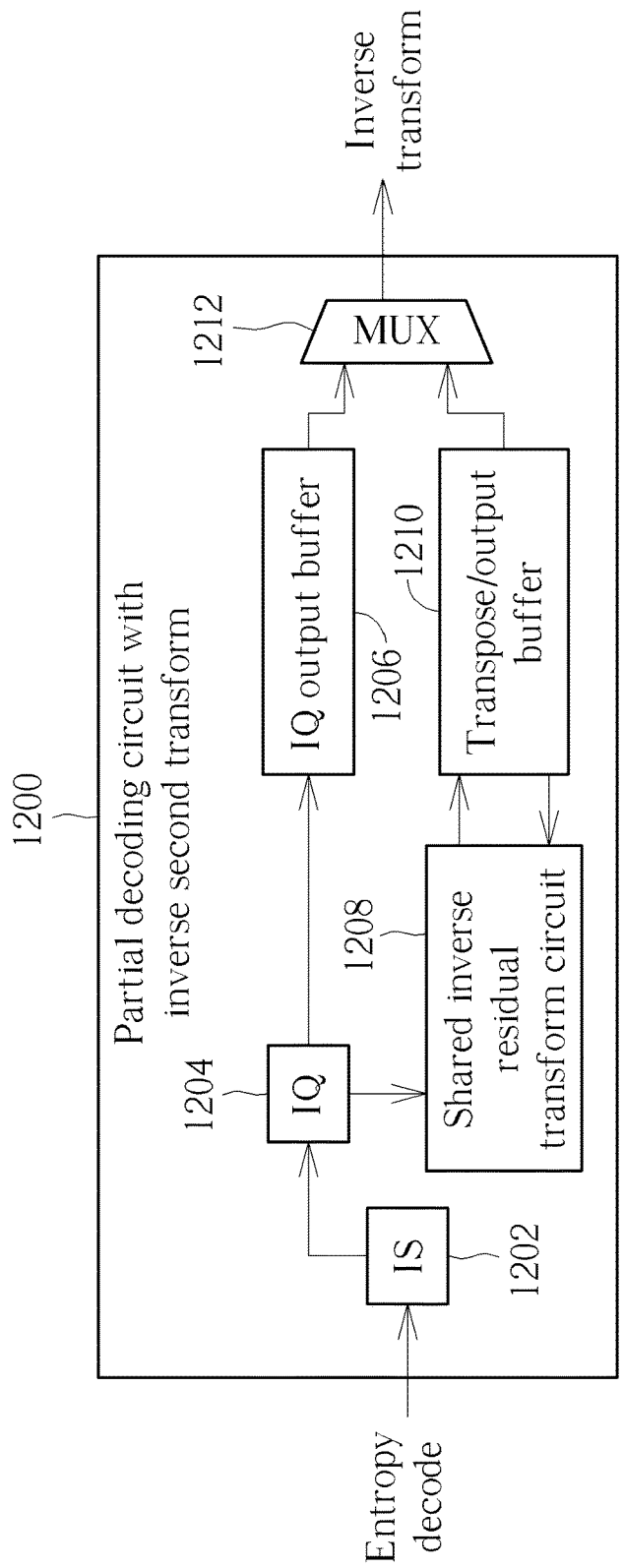
FIG. 14 is a diagram illustrating a partial decoding circuit with high-performance and low-cost inverse second transform according to an embodiment of the present invention.

FIG. 14 is a diagram illustrating a partial decoding circuit with high-performance and low-cost inverse second transform according to an embodiment of the present invention. The partial decoding circuit 404 in the video decoder 400 may be implemented using the partial decoding circuit 1200. The partial decoding circuit 1200 includes an inverse scan circuit (denoted by "IS") 1202, an inverse quantization circuit (denoted by "IQ") 1204, an inverse quantization output buffer (denoted by "IQ output buffer") 1206, a shared inverse residual transform circuit 1208, a transpose/output buffer 1210, and a multiplexer (denoted by "MUX") 1212. The inverse scan circuit 1202 is arranged to process a residual output of a preceding circuit and generate an inverse scan output, where the preceding circuit may be an entropy decoder (e.g., entropy decoder 402 shown in FIG. 4) if the partial decoding circuit 1200 is implemented in a video decoder. In this embodiment, the inverse scan circuit 1202 outputs a first inverse scan result associated with a first portion of residual data in a process unit (e.g., an NRTU of a PU) and a second inverse scan result associated with a second portion of residual data in the process unit (e.g., an NNRTU of the PU) to the inverse quantization circuit 1204, sequentially. Since the inverse quantization circuit 1204 processes the first inverse scan result before processing the second inverse scan result, the inverse quantization circuit 1204 generates an inverse quantization result of the first inverse scan result before generating an inverse quantization result of the second inverse scan result. Since the first inverse scan result is associated with an NRTU of a PU, the inverse quantization result of the first inverse scan result is output to the shared inverse residual transform circuit 1208 to undergo the inverse second transform. Since the second inverse scan result is associated with an NNRTU of a PU, the inverse quantization result of the second inverse scan result is not required to undergo the inverse second transform, and is stored into the inverse quantization output buffer 1206.

The shared inverse residual transform circuit 1208 and the transpose buffer 1210 may be regarded as an inverse second transform circuit. In this embodiment, the transpose/output buffer 1210 may be allocated in a storage space of a memory device, where the storage space serves as a transpose buffer used for storing an intermediate inverse residual transform result of the inverse second transform, and also serves as an inverse residual transform output buffer for storing a final inverse residual transform result of the inverse second transform. That is, the transpose buffer may also be used as an inverse residual transform output buffer. The shared inverse residual transform circuit 1208 may be implemented using the architecture of the residual transform kernel 200 shown in FIG. 2. In this embodiment, the shared inverse residual transform circuit 1208 is arranged to employ a same processing kernel (e.g., processing kernel 202 shown in FIG. 2) to perform a first-direction inverse residual transform operation and a second-direction inverse residual transform operation, wherein the first-direction inverse residual transform operation processes the inverse quantization result of the first inverse scan result (which is associated with the NRTU of the PU) to generate the intermediate inverse residual transform result to the transpose/output buffer 1210, and the second-direction inverse residual transform operation accesses the transpose/output buffer 1210 to retrieve the intermediate inverse residual transform result, and processes the intermediate inverse residual transform result to generate the final inverse residual transform result of the second transform. In one exemplary design, the first-direction inverse residual transform operation may be inverse horizontal transform, and the second-direction inverse residual transform operation may be inverse vertical transform. In another exemplary design, the first-direction inverse residual transform operation may be inverse vertical transform, and the second-direction inverse residual transform operation may be inverse horizontal transform. Since the function of the shared inverse residual transform circuit 1208 is identical to that of the shared inverse residual transform circuit 1006, further description is omitted here for brevity.

The multiplexer 1212 is arranged to selectively connect the inverse quantization output buffer 1206 or the transpose/output buffer 1210 to set a multiplexer output that is transmitted to a following circuit (e.g., inverse transform circuit 406 shown in FIG. 4). Hence, the final inverse residual transform result of the inverse second transform (which is associated with the NRTU of the PU) is further processed by the inverse transform circuit (e.g., inverse transform circuit 406 shown in FIG. 4), and the inverse quantization result of the second inverse scan result (which is associated with the NNRTU of the PU) is further processed by the inverse transform circuit (e.g., inverse transform circuit 406 shown in FIG. 4).

Figure 15:
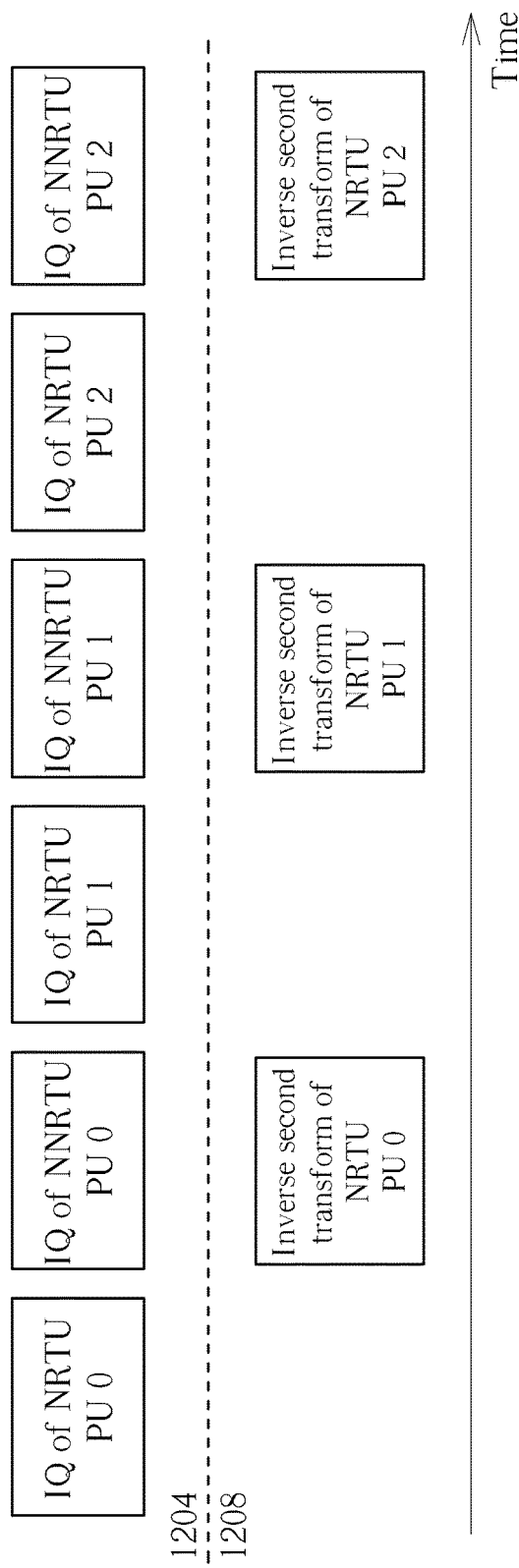
FIG. 15 is a diagram illustrating parallel processing of NNRTU inverse quantization and NRTU inverse second transform according to an embodiment of the present invention.

In this embodiment, the partial encoding circuit 1200 employs a high-performance and low-cost residual transform design. Concerning the high-performance residual transform design, it has two separate circuits (i.e., inverse quantization circuit 1204 and shared inverse residual transform circuit 1208) for supporting parallel processing of NNRTU inverse quantization and NRTU inverse second transform. FIG. 15 is a diagram illustrating parallel processing of NNRTU inverse quantization and NRTU inverse second transform according to an embodiment of the present invention. After the inverse quantization circuit 1204 generates and outputs an inverse quantization result of NRTU in PU 0, the shared inverse residual transform circuit 1208 performs inverse second transform upon the inverse quantization result of NRTU in PU 0. At this moment, the inverse quantization circuit 1204 performs inverse quantization upon NNRTU in PU 0. Similarly, after the inverse quantization circuit 1204 generates and outputs an inverse quantization result of NRTU in PU 1, the shared inverse residual transform circuit 1208 performs inverse second transform upon the inverse quantization result of NRTU in PU 1. At this moment, the inverse quantization circuit 1204 performs inverse quantization upon NNRTU in PU 1. In this way, the inverse quantization circuit 1204 and the shared inverse residual transform circuit 1208 perform parallel processing of NNRTU inverse quantization and NRTU inverse second transform for different portions in the same PU. In other words, the processing time of inverse quantization associated with an NNRTU in a PU is overlapped with the processing time of inverse second transform of an NRTU in the same PU.

Concerning the low-cost residual transform design, it uses a single processing kernel to support inverse residual transform in two directions. Specifically, the low-cost inverse residual transform design uses a processing kernel to deal with the first-direction inverse residual transform operation and then re-uses the same processing kernel to deal with the second-direction inverse residual transform operation.

Figure 16:
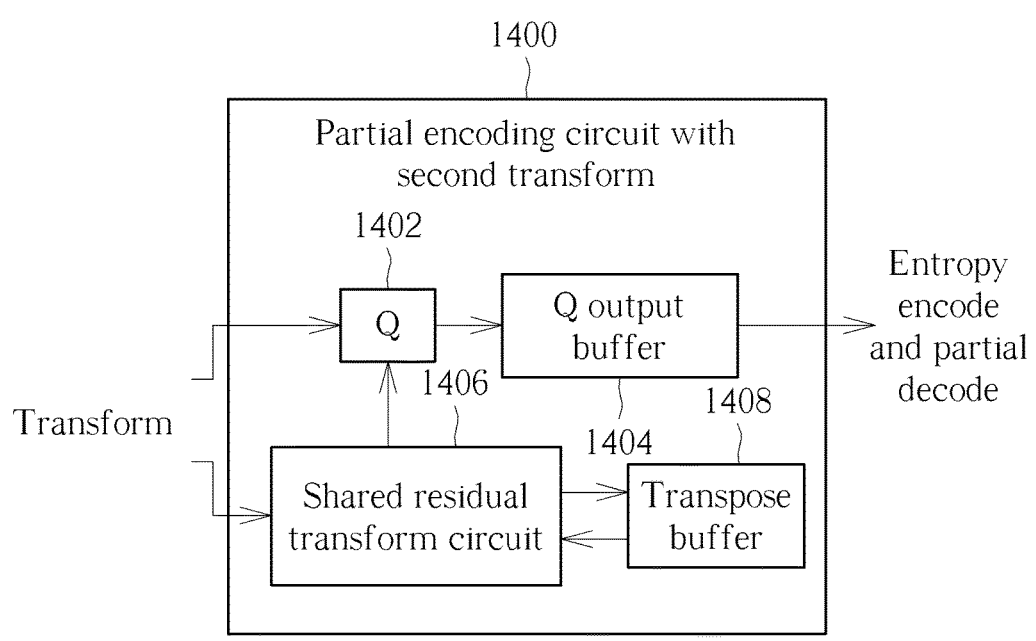
FIG. 16 is a diagram illustrating a partial encoding circuit with high-performance and low-cost second transform according to an embodiment of the present invention.

FIG. 16 is a diagram illustrating a partial encoding circuit with high-performance and low-cost second transform according to an embodiment of the present invention. The partial encoding circuit 506 in the video encoder 500 may be implemented using the partial encoding circuit 1400. The partial encoding circuit 1400 includes a quantization circuit (denoted by "Q") 1402, a quantization output buffer (denoted by "Q output buffer") 1404, a shared residual transform circuit 1406, and a transpose buffer 1408. A first transform output associated with a first portion of residual transform data in a process unit (e.g., an NNRTU in a PU) is generated from a preceding circuit (e.g., transform circuit 504 shown in FIG. 5) to the quantization circuit 1402, and a second transform output associated with a second portion of residual transform data in the process unit (e.g., an NRTU in the PU) is generated from the preceding circuit (e.g., transform circuit 504 shown in FIG. 5) to the shared residual transform circuit 1406. In this embodiment, the quantization circuit 1402 processes the first transform output (which is associated with the NNRTU of the PU) and the shared residual transform circuit 1406 processes the second transform output (which is associated with the NRTU of the PU) in a parallel manner.

The shared residual transform circuit 1406 and the transpose buffer 1408 may be regarded as a second transform circuit. The transpose buffer 1408 is arranged to store an intermediate residual transform result of the second transform. The shared residual transform circuit 1406 may be implemented using the architecture of the residual transform kernel 200 shown in FIG. 2. In this embodiment, the shared residual transform circuit 1406 is arranged to employ a same processing kernel (e.g., processing kernel 202 shown in FIG. 2) to perform a first-direction residual transform operation and a second-direction residual transform operation, wherein the first-direction residual transform operation processes the second transform output (which is associated with the NRTU of the PU) to generate the intermediate residual transform result to the transpose buffer 1408, and the second-direction residual transform operation accesses the transpose buffer 1408 to retrieve the intermediate residual transform result, and processes the intermediate residual transform result to generate a final residual transform result of the second transform to the quantization circuit 1402. In one exemplary design, the first-direction residual transform operation may be vertical transform, and the second-direction residual transform operation may be horizontal transform. In another exemplary design, the first-direction inverse residual transform operation may be horizontal transform, and the second-direction residual transform operation may be vertical transform. Since the function of the shared residual transform circuit 1406 is identical to that of the shared residual transform circuit 1102, further description is omitted here for brevity.

The quantization circuit 1402 sequentially processes the first transform output (which is associated with the NNRTU of the PU) and the final residual transform result of the second transform to generate a quantization output to the quantization output buffer 1404, where the quantization output is further processed by a following circuit (e.g., entropy encoder 512 and partial decoding circuit 514 shown in FIG. 5).

Figure 17:
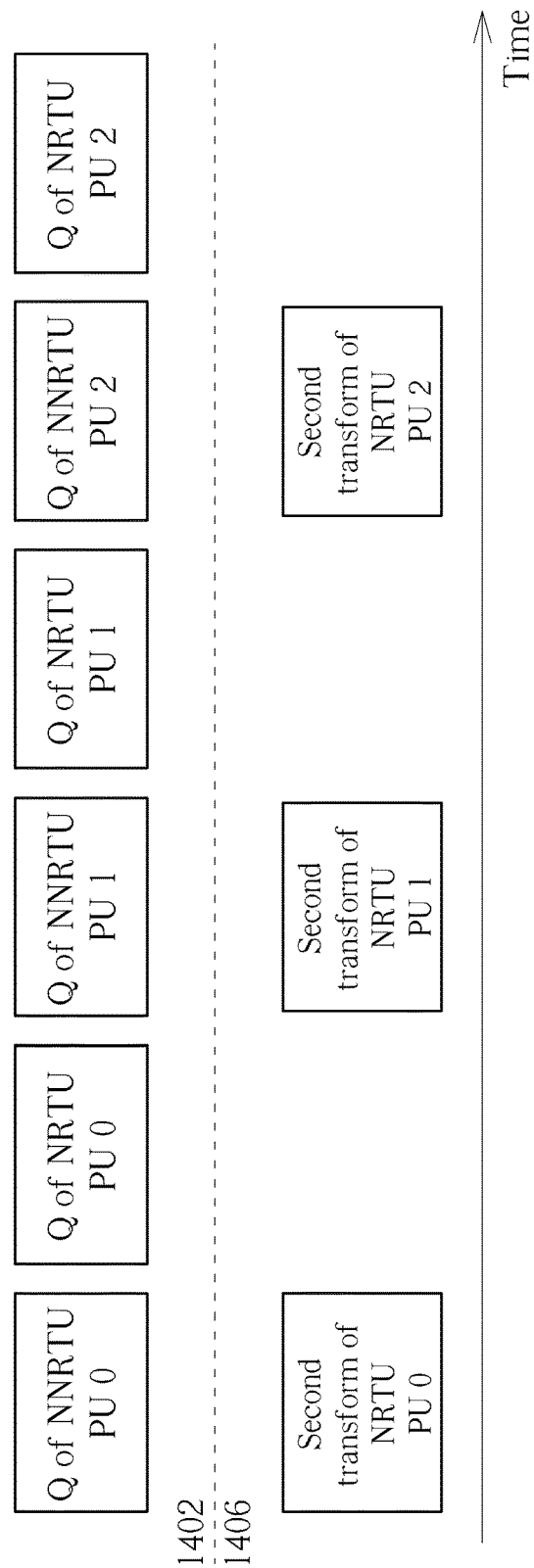
FIG. 17 is a diagram illustrating parallel processing of NNRTU quantization and NRTU second transform according to an embodiment of the present invention.

In this embodiment, the partial encoding circuit 1400 employs a high-performance and low-cost residual transform design. Concerning the high-performance residual transform design, it has two separate circuits (i.e., quantization circuit 1402 and shared residual transform circuit 1406) for supporting parallel processing of NNRTU quantization and NRTU second transform. FIG. 17 is a diagram illustrating parallel processing of NNRTU quantization and NRTU second transform according to an embodiment of the present invention. When the quantization circuit 1402 performs quantization upon the first transform result associated with NNRTU of PU0, the shared residual transform circuit 1406 performs the second transform upon the first transform result associated with NRTU of PU0. After the final residual transform result of the second transform performed for NRTU of PU0 is generated from the shared residual transform circuit 1406, the quantization circuit 1402 performs quantization upon the final residual transform result of the second transform. Similarly, when the quantization circuit 1402 performs quantization upon the first transform result associated with NNRTU of PU1, the shared residual transform circuit 1406 performs second transform upon the first transform result associated with NRTU of PU1. After the final residual transform result of the second transform performed for NRTU of PU1 is generated from the shared residual transform circuit 1406, the quantization circuit 1402 performs quantization upon the final residual transform result of the second transform. In this way, the quantization circuit 1402 and the shared residual transform circuit 1406 perform parallel processing of NNRTU quantization and NRTU second transform for different portions in the same PU. In other words, the processing time of quantization associated with an NNRTU in a PU is overlapped with the processing time of second transform of an NRTU in the same PU.

Concerning the low-cost residual transform design, it uses a single processing kernel to support residual transform in two directions. Specifically, the low-cost residual transform design uses a processing kernel to deal with the first-direction residual transform operation and then re-uses the same processing kernel to deal with the second-direction residual transform operation.

Figure 18:
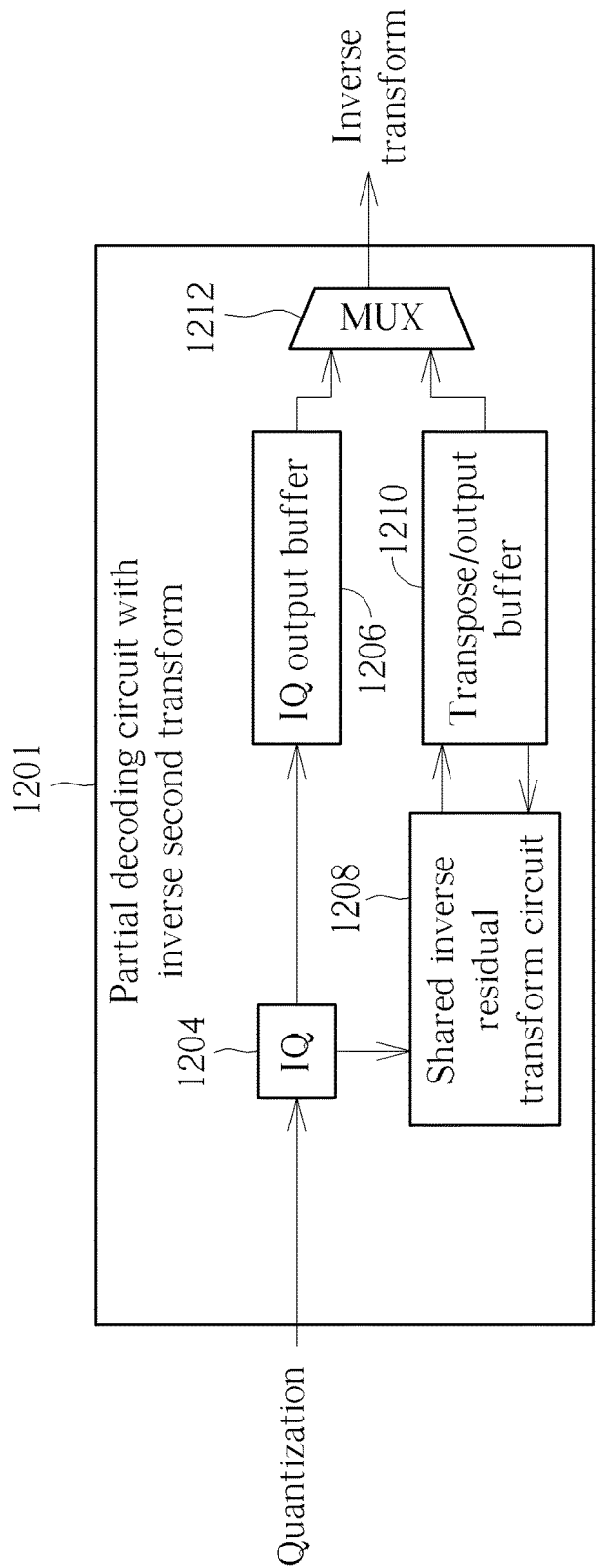
FIG. 18 is a diagram illustrating another partial decoding circuit with high-performance and low-cost inverse second transform according to an embodiment of the present invention.

FIG. 18 is a diagram illustrating another partial decoding circuit with high-performance and low-cost inverse second transform according to an embodiment of the present invention. The partial decoding circuit 514 in the video decoder 500 may be implemented using the partial decoding circuit 1201. The partial decoding circuit 1201 shown in FIG. 18 may be constructed by omitting the inverse scan circuit 1202 in the partial decoding circuit 1200 shown in FIG. 14. The partial decoding circuit 1201 is arranged to process a residual output of a preceding circuit and generate a partial decoding result to a following circuit, where the preceding circuit may be the partial encoding circuit 506 (particularly, a quantization circuit in the partial encoding circuit 506) and the following circuit may be the inverse transform circuit 518 if the partial decoding circuit 1201 is implemented in the video encoder 500. As a person skilled in the art can readily understand details of the partial decoding circuit 1201 after reading above paragraphs directed to the partial decoding circuit 1200, further description is omitted here for brevity.

In above exemplary partial decoding circuits 600, 1000, 1200, an inverse second transform circuit is located after an inverse scan circuit and an inverse quantization circuit. However, these are for illustrative purposes only, and are not meant to be limitations of the present invention. In some embodiments of the present invention, at least one of an inverse scan circuit and an inverse quantization circuit may be located before the inverse second transform circuit, and at least one of another inverse scan circuit and another inverse quantization circuit may be located after the inverse second transform circuit. For example, inverse scan/inverse quantization is applied to an NRTU in a PU before inverse scan/inverse quantization is applied to an NNRTU in the PU. Alternative designs of the aforementioned partial decoding circuits 600, 1000, 1200 are detailed as below.

Figure 19:
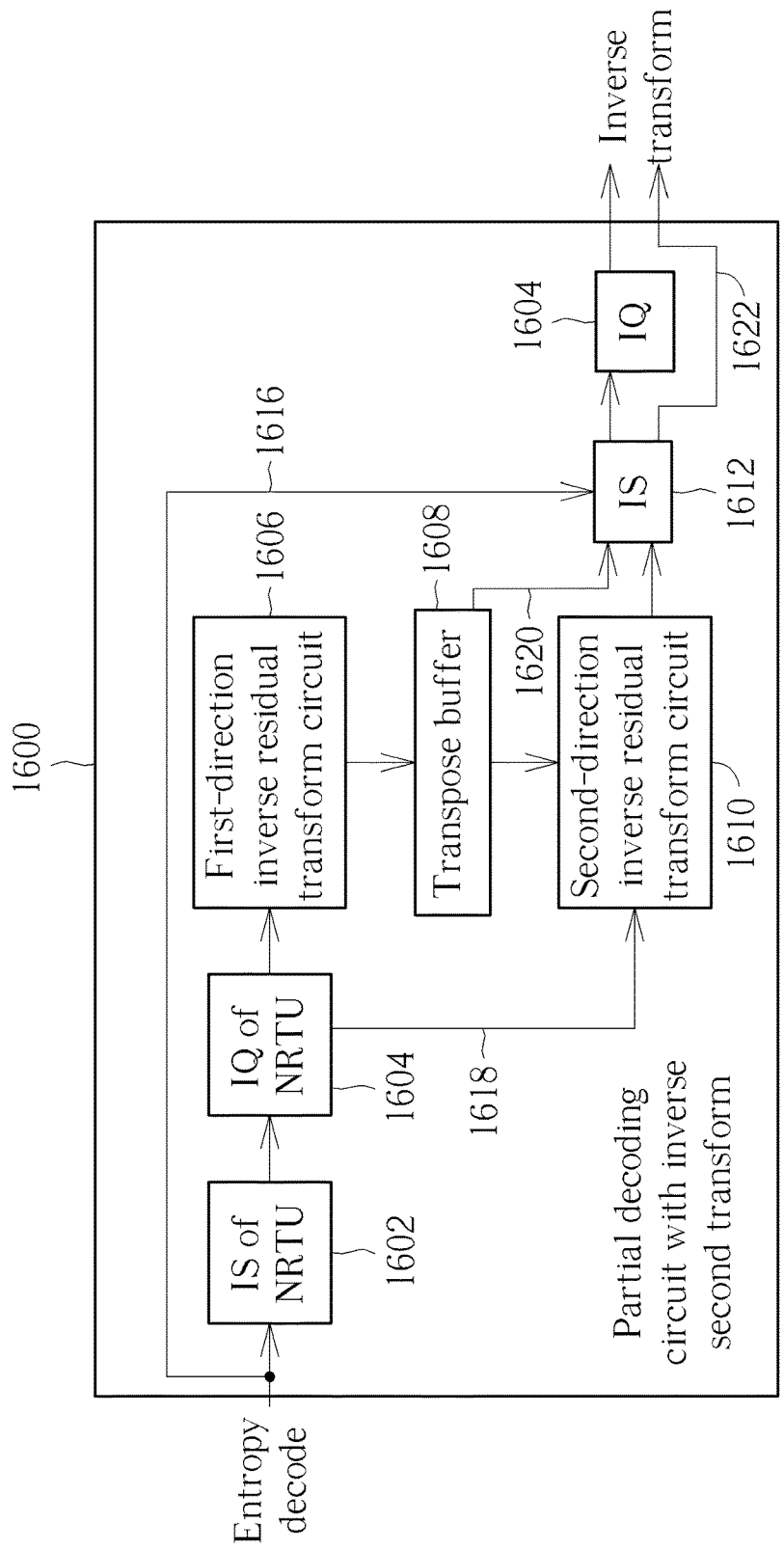
FIG. 19 is a diagram illustrating a partial decoding circuit with another high-performance inverse second transform according to an embodiment of the present invention.

FIG. 19 is a diagram illustrating a partial decoding circuit with another high-performance inverse second transform according to an embodiment of the present invention. The partial decoding circuit 404 in the video decoder 400 may be implemented using the partial decoding circuit 1600. The partial decoding circuit 1600 employs the same high-performance inverse second transform design as used by the partial decoding circuit 600. The partial decoding circuit 1600 includes an inverse scan circuit (denoted by "IS of NRTU") 1602, an inverse quantization circuit (denoted by "IQ of NRTU") 1604, a first-direction inverse residual transform circuit 1606, a transpose buffer 1608, a second-direction inverse residual transform circuit 1610, another inverse scan circuit (denoted by "IS") 1612, another inverse quantization circuit (denoted by "IQ") 1614, and a plurality of bypass paths 1616, 1618, 1620, 1622. The first-direction inverse residual transform circuit 1606, the transpose buffer 1608, and the second-direction inverse residual transform circuit 1610 may be regarded as an inverse second transform circuit. In one exemplary design, the first-direction inverse residual transform circuit 1606 may be an inverse horizontal residua transform circuit, and the second-direction inverse residual transform circuit 1610 may be an inverse vertical residual transform circuit. In another exemplary design, the first-direction inverse residual transform circuit 1606 may be an inverse vertical residual transform circuit, and the second-direction inverse residual transform circuit 1610 may be an inverse horizontal residual transform circuit.

In this embodiment, the partial decoding circuit 1600 employs a high-performance inverse residual transform design that has two separate circuits (i.e., first-direction inverse residual transform circuit 1606 and second-direction inverse residual transform circuit 1610) for supporting parallel processing of inverse horizontal transform and inverse vertical transform. For example, the first-direction inverse residual transform circuit 1606 and the second-direction inverse residual transform circuit 1610 may process partial residual transform data of different PUs in a parallel processing manner. Since the function and operation of the first-direction inverse residual transform circuit 1606, the transpose buffer 1608, and the second-direction inverse residual transform circuit 1610 are identical to that of the first-direction inverse residual transform circuit 606, the transpose buffer 608, and the second-direction inverse residual transform circuit 610, further description is omitted here for brevity.

The partial decoding circuit 1600 is arranged to process a residual output of a preceding circuit, where the preceding circuit may be an entropy decoder (e.g., entropy decoder 402 shown in FIG. 4) if the partial decoding circuit 1600 is implemented in a video decoder. The residual output of the preceding circuit (e.g., entropy decoder 402 shown in FIG. 4) includes a first residual output associated with a first portion of residual transform data in a process unit (e.g., an NRTU of a PU) and a second residual output associated with a second portion of residual transform data in the process unit (e.g., an NNRTU of the PU). Since the first residual output is required to undergo inverse second transform, the first residual output is fed into the inverse scan circuit 1602. Since the second residual output is not required to undergo inverse second transform, the second residual output is fed into the inverse scan circuit 1612 via the bypass path 1616. The inverse scan circuit 1602 processes the first residual output to generate and output a first inverse scan result of the first residual output (which is associated with the NRTU of the PU), and the inverse quantization circuit 1604 processes the first inverse scan result to generate an inverse quantization output fed into the first-direction inverse residual transform circuit 1606.

In this embodiment, an inverse scan buffer (not shown) of the inverse scan circuit 1612 may also serve as an output buffer of the inverse second transform circuit. Hence, a final inverse residual transform result of the inverse second transform performed for the first residual output (which is associated with the NRTU of the PU) is stored in the inverse scan buffer. It should be noted that the final inverse residual transform result is not required to be processed by the inverse scan circuit 1612 and the inverse quantization circuit 1614. Hence, the final inverse residual transform result stored in the inverse scan buffer is output to an inverse transform circuit (e.g., inverse transform circuit 406 shown in FIG. 4) via the bypass path 1622.

With regard to the second residual output which is associated with the NNRTU of the PU, it is processed by the inverse scan circuit 1612 and the inverse quantization circuit 1614, where an inverse quantization result of the inverse quantization circuit 1612 is output to an inverse transform circuit (e.g., inverse transform circuit 406 shown in FIG. 4).

In this embodiment, the inverse scan circuit 1602 is designed to process the first residual output (which is associated with the NRTU of the PU), and does not generate a second inverse scan result of the second residual output (which is associated with the NNRTU of the PU). Hence, the inverse quantization circuit 1604 does not process the second inverse scan result of the second residual output (which is associated with the NNRTU of the PU).

When the residual transform data of the NRTU in one PU are not required to be processed by one or both of inverse horizontal residual transform and inverse vertical residual transform, one of the bypass paths 1618 and 1620 can be used to transmit the residual transform data. As shown in FIG. 19, the bypass path 1618 is coupled between the output of the inverse quantization circuit 1604 and an input of the second-direction inverse residual transform circuit 1610, and the bypass path 1620 is coupled between an output of the transpose buffer 1608 and the input of the inverse transform circuit 1612. In a first case where the residual transform data of the NRTU in one PU are not required to be processed by first-direction inverse residual transform circuit 1606, the bypass path 1618 is selected and used to transmit the residual transform data to thereby bypass first-direction inverse residual transform circuit 1606. In a second case where the residual transform data in the NRTU of one PU are not required to be processed by second-direction inverse residual transform circuit 1610, the bypass path 1620 is selected and used to transmit the residual transform data to thereby bypass second-direction inverse residual transform circuit 1610.

Figure 20:
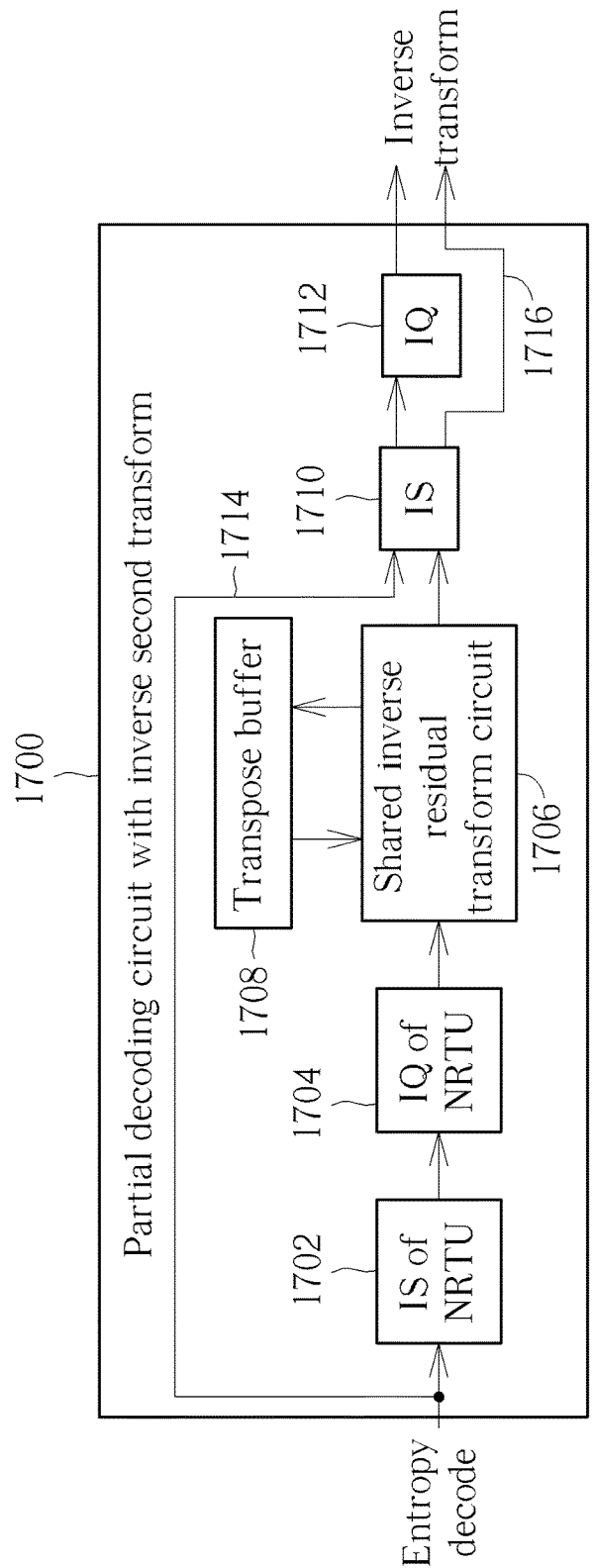
FIG. 20 is a diagram illustrating a partial decoding circuit with another low-cost inverse second transform according to an embodiment of the present invention.

FIG. 20 is a diagram illustrating a partial decoding circuit with another low-cost inverse second transform according to an embodiment of the present invention. The partial decoding circuit 404 in the video decoder 400 may be implemented using the partial decoding circuit 1700. The partial decoding circuit 1700 employs the same low-cost inverse second transform design as used by the partial decoding circuit 1000. The partial decoding circuit 1700 includes an inverse scan circuit (denoted by "IS of NRTU") 1702, an inverse quantization circuit (denoted by "IQ of NRTU") 1704, a shared inverse residual transform circuit 1706, a transpose buffer 1708, another inverse scan circuit (denoted by "IS") 1710, another inverse quantization circuit (denoted by "IQ") 1712, and a plurality of bypass paths 1714, 1716. The shared inverse residual transform circuit 1706 and the transpose buffer 1708 may be regarded as an inverse second transform circuit. The shared inverse residual transform circuit 1706 employs a same processing kernel to perform a first-direction inverse residual transform operation and a second-direction inverse residual transform operation. In one exemplary design, the first-direction inverse residual transform operation may be inverse horizontal transform, and the second-direction inverse residual transform operation may be inverse vertical transform. In another exemplary design, the first-direction inverse residual transform may be inverse vertical transform, and the second-direction inverse residual transform may be inverse horizontal transform.

In this embodiment, the partial decoding circuit 1700 employs a low-cost inverse residual transform design that uses a single processing kernel to support inverse residual transform in two directions. Specifically, the low-cost inverse residual transform design uses a processing kernel to deal with the first-direction inverse residual transform operation and then re-uses the same processing kernel to deal with the second-direction inverse residual transform operation. Since the function and operation of the shared inverse residual transform circuit 1706 and the transpose buffer 1708 are identical to that of the shared inverse residual transform circuit 1006 and the transpose buffer 1008, further description is omitted here for brevity.

The partial decoding circuit 1700 is arranged to process a residual output of a preceding circuit, where the preceding circuit may be an entropy decoder (e.g., entropy decoder 402 shown in FIG. 4) if the partial decoding circuit 1700 is implemented in a video decoder. The residual output of the preceding circuit (e.g., entropy decoder 402 shown in FIG. 4) includes a first residual output associated with a first portion of residual transform data in a process unit (e.g., an NRTU of a PU) and a second residual output associated with a second portion of residual transform data in the process unit (e.g., an NNRTU of the PU). Since the first residual output is required to undergo inverse second transform, the first residual output is fed into the inverse scan circuit 1702. Since the second residual output is not required to undergo inverse second transform, the second residual output is fed into the inverse scan circuit 1710 via the bypass path 1714. The first inverse scan circuit 1702 processes the first residual output to generate and output a first inverse scan result of the first residual output (which is associated with the NRTU of the PU), and the first inverse quantization circuit 1704 processes the first inverse scan result to generate an inverse quantization output fed into the shared inverse residual transform circuit 1706.

In this embodiment, an inverse scan buffer (not shown) of the inverse scan circuit 1710 also serves as an output buffer of the inverse second transform circuit. Hence, a final inverse residual transform result of the inverse second transform performed for the first residual output (which is associated with the NRTU of the PU) is stored in the inverse scan buffer. It should be noted that the final inverse residual transform result is not required to be processed by the inverse scan circuit 1710 and the inverse quantization circuit 1712. Hence, the final inverse residual transform result stored in the inverse scan buffer is output to a following circuit (e.g., inverse transform circuit 406 shown in FIG. 4) via the bypass path 1716.

With regard to the second residual output which is associated with the NNRTU of the PU, it is processed by the inverse scan circuit 1710 and the inverse quantization circuit 1712, where an inverse quantization result of the inverse quantization circuit 1712 is transmitted to an inverse transform circuit (e.g., inverse transform circuit 406 shown in FIG. 4).

It should be noted that, in this embodiment, the inverse scan circuit 1702 is designed to process the first residual output (which is associated with the NRTU of the PU), and therefore does not generate a second inverse scan result of the second residual output (which is associated with the NNRTU of the PU). Hence, the inverse quantization circuit 1704 does not process the second inverse scan result of the second residual output (which is associated with the NNRTU of the PU).

Figure 21:
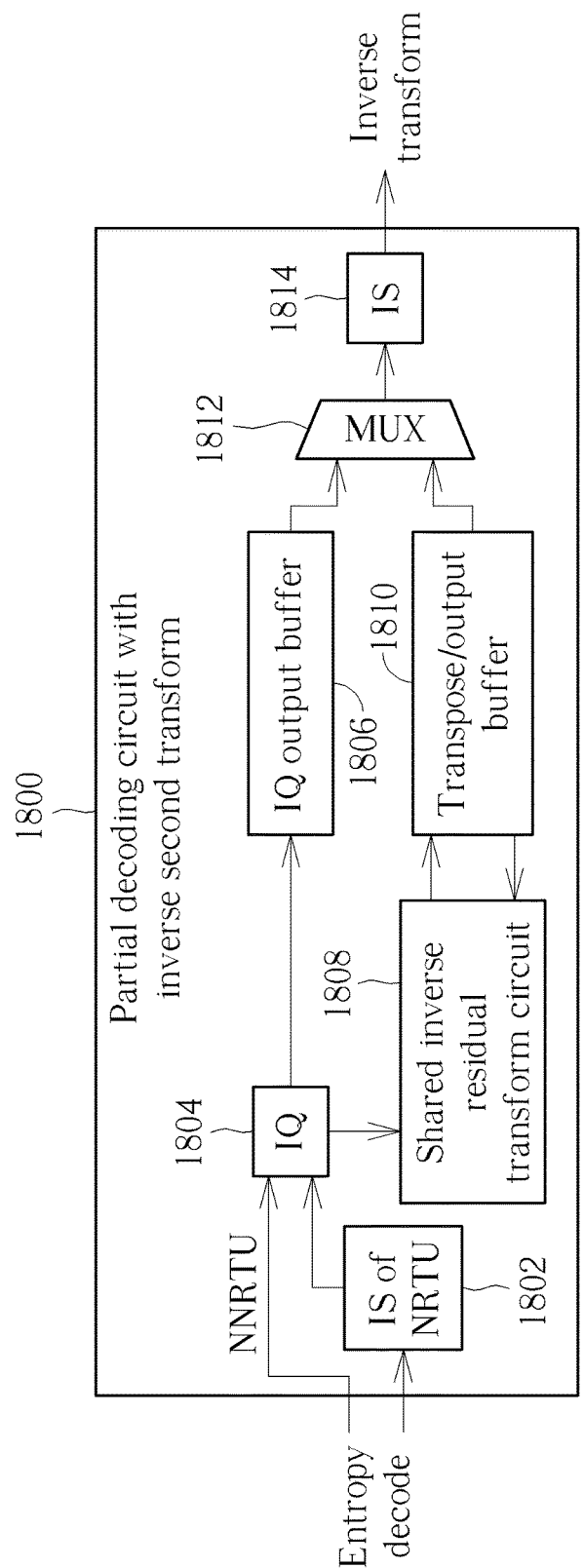
FIG. 21 is a diagram illustrating a partial decoding circuit with another high-performance and low-cost inverse second transform according to an embodiment of the present invention.

FIG. 21 is a diagram illustrating a partial decoding circuit with another high-performance and low-cost inverse second transform according to an embodiment of the present invention. The partial decoding circuit 404 in the video decoder 400 may be implemented using the partial decoding circuit 1800. The partial decoding circuit 1800 employs the same high-performance and low-cost inverse second transform design as used by the partial decoding circuit 1200. The partial decoding circuit 1800 includes an inverse scan circuit (denoted by "IS of NRTU") 1802, an inverse quantization circuit (denoted by "IQ") 1804, an inverse quantization output buffer (denoted by "IQ output buffer") 1806, a shared inverse residual transform circuit 1808, a transpose/output buffer 1810, a multiplexer (denoted by "MUX") 1812, and another inverse scan circuit (denoted by "IS") 1814. The shared inverse residual transform circuit 1808 and the transpose/output buffer 1810 may be regarded as an inverse second transform circuit. The shared inverse residual transform circuit 1806 employs a same processing kernel to perform a first-direction inverse residual transform operation and a second-direction inverse residual transform operation. In one exemplary design, the first-direction inverse residual transform operation may be inverse horizontal transform, and the second-direction inverse residual transform operation may be inverse vertical transform. In another exemplary design, the first-direction inverse residual transform may be inverse vertical transform, and the second-direction inverse residual transform may be inverse horizontal transform.

The partial decoding circuit 1800 is arranged to process a residual output of a preceding circuit, where the preceding circuit may be an entropy decoder (e.g., entropy decoder 402 shown in FIG. 4) if the partial decoding circuit 1800 is implemented in a video decoder. The residual output of the preceding circuit (e.g., entropy decoder 402 shown in FIG. 4) includes a first residual output associated with a first portion of residual transform data in a process unit (e.g., an NRTU of a PU) and a second residual output associated with a second portion of residual transform data in the process unit (e.g., an NNRTU of the PU). In this embodiment, the preceding circuit (e.g., entropy decoder 402 shown in FIG. 4) outputs the first residual output (which is associated with the NRTU of the PU) to the inverse scan circuit 1802 and outputs the second residual output (which is associated with the NNRTU of the PU) to the inverse quantization circuit 1804, sequentially. For example, the inverse scan circuit 1802 may process the first residual output (which is associated with the NRTU of the PU) and the inverse quantization circuit 1804 may process an inverse scan of the first residual output (which is associated with the NRTU of the PU) before the inverse quantization circuit 1804 processes the second residual output (which is associated with the NNRTU of the PU).

The shared inverse residual transform circuit 1808 performs inverse second transform, including a first-direction inverse residual transform operation and a second-direction inverse residual transform operation, upon the inverse quantization result associated with the NRTU of the PU to generate a final inverse residual transform result of the inverse second transform, where an intermediate inverse residual transform result of the inverse second transform is generated by the first-direction inverse residual transform operation and stored in the transpose/output buffer 1810, and the final inverse residual transform result is generated by the second-direction inverse residual transform operation according to the intermediate inverse residual transform result read from the transpose/output buffer 1810. Since the function and operation of the shared inverse residual transform circuit 1808 and the transpose/output buffer 1810 are identical that of the shared inverse residual transform circuit 1208 and the transpose/output buffer 1210, further description is omitted here for brevity.

The inverse quantization circuit 1804 further processes the second residual output to generate an inverse quantization result associated with the NNRTU of the PU, where the inverse quantization result associated with the NNRTU of the PU is stored in the inverse quantization output buffer 1806.

The multiplexer 1812 is arranged to selectively connect the inverse quantization output buffer 1806 or the transpose/output buffer 1810 to set a multiplexer output that is transmitted to the inverse scan circuit 1814. The inverse scan circuit 1814 does not need to perform inverse scan upon the final inverse residual transform result of the inverse second transform associated with the NRTU of the PU. Hence, an inverse scan buffer (not shown) of the inverse scan circuit 1814 merely stores the final inverse residual transform result of the inverse second transform, and then outputs the final inverse residual transform result of the inverse second transform to a following circuit (e.g., inverse transform circuit 406 shown in FIG. 4). As for the inverse quantization result associated with the NNRTU of the PU, it is read from the inverse quantization output buffer 1806, and then processed by the inverse scan circuit 1814 to generate an inverse scan result associated with the NNRTU of the PU to the following circuit (e.g., inverse transform circuit 406 shown in FIG. 4).

It should be noted that, in this embodiment, the second residual output generated from the preceding circuit (e.g., entropy decoder 402 shown in FIG. 4) is first processed by the inverse quantization circuit 1804 and then processed by the inverse scan circuit 1814, which is different from the decoding order used by the partial decoding circuit 1200. However, with proper configurations of the inverse quantization circuit 1804 and the inverse scan circuit 1814 shown in FIG. 21, an inverse scan result generated from the inverse scan circuit 1814 for an NNRTU of a PU would be the same as an inverse quantization result generated from the inverse quantization circuit 1204 for the NNRTU of the same PU.

Figure 22:
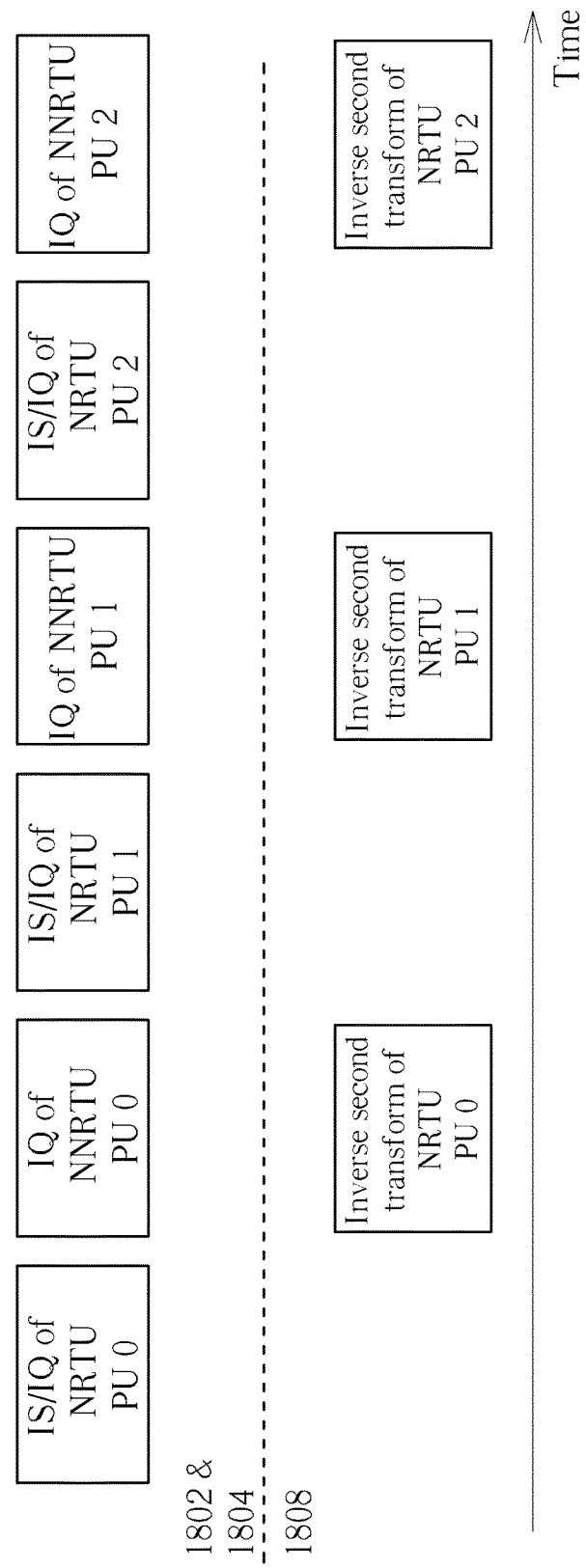
FIG. 22 is a diagram illustrating another parallel processing of NNRTU inverse quantization and NRTU inverse second transform according to an embodiment of the present invention.

In this embodiment, the partial decoding circuit 1800 employs a high-performance and low-cost inverse residual transform design. Concerning the high-performance inverse residual transform design, it has two separate circuits (i.e., inverse quantization circuit 1804 and shared inverse residual transform circuit 1808) for supporting parallel processing of NNRTU inverse quantization and NRTU inverse second transform. FIG. 22 is a diagram illustrating another parallel processing of NNRTU inverse quantization and NRTU inverse second transform according to an embodiment of the present invention. After the inverse scan circuit 1802 generates and outputs an inverse scan result of NRTU in PU 0, the inverse quantization circuit 1804 processes inverse scan result of NRTU in PU 0. After the inverse quantization circuit 1804 1204 generates and outputs an inverse quantization result of NRTU in PU 0, the shared inverse residual transform circuit 1808 performs inverse second transform upon the inverse quantization result of NRTU in PU 0. At this moment, the inverse quantization circuit 1804 performs inverse quantization upon NNRTU in PU 0. Similarly, after the inverse scan circuit 1802 generates and outputs an inverse scan result of NRTU in PU 1, the inverse quantization circuit 1804 processes inverse scan result of NRTU in PU 1. After the inverse quantization circuit 1804 1204 generates and outputs an inverse quantization result of NRTU in PU 1, the shared inverse residual transform circuit 1808 performs inverse second transform upon the inverse quantization result of NRTU in PU 1. At this moment, the inverse quantization circuit 1804 performs inverse quantization upon NNRTU in PU 1. In this way, the inverse quantization circuit 1804 and the shared inverse residual transform circuit 1808 perform parallel processing of NNRTU inverse quantization and NRTU inverse second transform for different portions in the same PU. In other words, the processing time of inverse quantization associated with an NNRTU in a PU is overlapped with the processing time of inverse second transform of an NRTU in the same PU.

Concerning the low-cost residual transform design, it uses a single processing kernel to support inverse residual transform in two directions. Specifically, the low-cost inverse residual transform design uses a processing kernel to deal with the first-direction inverse residual transform operation and then re-uses the same processing kernel to deal with the second-direction inverse residual transform operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A partial decoding circuit with inverse second transform, comprising:
    a transpose buffer, arranged to store an intermediate inverse residual transform result of the inverse second transform;
    a first-direction inverse residual transform circuit, arranged to process an inverse quantization output of an inverse quantization circuit to generate the intermediate inverse residual transform result to the transpose buffer;
    a second-direction inverse residual transform circuit, arranged to access the transpose buffer to retrieve the intermediate inverse residual transform result, and process the intermediate inverse residual transform result to generate a final inverse residual transform result of the inverse second transform, wherein the final inverse residual transform result of the inverse second transform is further processed by an inverse transform circuit; and
    a bypass path, arranged to transmit residual transform data that is not needed to be processed by one or both of the first-direction inverse residual transform circuit and the second-direction inverse residual transform circuit;
    wherein the bypass path is coupled between an output of the inverse quantization circuit and an input of the inverse transform circuit, or coupled between the output of the inverse quantization circuit and an input of the second-direction inverse residual transform circuit, or coupled between an output of the transpose buffer and the input of the inverse transform circuit;
    wherein the first-direction inverse residual transform circuit and the second-direction inverse residual transform circuit are arranged to process partial residual transform data of different process units in a parallel processing manner.

2. The partial decoding circuit of claim 1, wherein the bypass path is coupled between the output of the inverse quantization circuit and the input of the second-direction inverse residual transform circuit, the inverse quantization circuit is part of the partial decoding circuit, and the partial decoding circuit further comprises:
    an inverse scan circuit, arranged to generate and output a first inverse scan result associated with a first portion of residual transform data in a process unit according to a residual output of a preceding circuit;
    wherein the inverse quantization circuit processes the first inverse scan result to generate the inverse quantization output fed into the first-direction inverse residual transform circuit; a second portion of the residual transform data in the process unit is not processed by both of the first-direction inverse residual transform circuit and the second-direction inverse residual transform circuit; and the first inverse scan result is generated before a second inverse scan result associated with the second portion of the residual data in the process unit is generated.

3. The partial decoding circuit of claim 2, wherein the inverse scan circuit of the partial decoding circuit does not generate the second inverse scan result, and the inverse quantization circuit of the partial decoding circuit does not process the second inverse scan result.

4. The partial decoding circuit of claim 3, wherein the second inverse scan result is generated by another inverse scan circuit, and the partial decoding circuit further comprises:
    another bypass path, arranged to transmit residual transform data that is not needed to be processed by one or both of the first-direction inverse residual transform circuit and the second-direction inverse residual transform circuit;
    wherein said another bypass path is coupled between an output of the preceding circuit and an input of said another inverse scan circuit, or coupled between the output of the transpose buffer and the input of said another inverse scan circuit.

5. A partial encoding circuit with second transform, comprising:
    a transpose buffer, arranged to store an intermediate residual transform result of the second transform;
    a first-direction residual transform circuit, arranged to process a transform output of a transform circuit to generate the intermediate residual transform result to the transpose buffer;
    a second-direction residual transform circuit, arranged to access the transpose buffer to retrieve the intermediate residual transform result, and process the intermediate residual transform result to generate a final residual transform result of the second transform, wherein the final residual transform result is further processed by a quantization circuit; and
    a bypass path, arranged to transmit residual transform data that is not needed to be processed by one or both of the first-direction residual transform circuit and the second-direction residual transform circuit
    wherein the bypass path is coupled between an output of the transform circuit and an input of the quantization circuit, or coupled between the output of the transform circuit and an input of the second-direction inverse residual transform circuit, or coupled between an output of the transpose buffer and the input of the quantization circuit;

wherein the first-direction residual transform circuit and the second-direction residual transform circuit are arranged to process partial residual transform data of different process units in a parallel processing manner.

6. A partial decoding circuit with inverse second transform, comprising:
  a transpose buffer, arranged to store an intermediate inverse residual transform result of the inverse second transform;
  a shared inverse residual transform circuit, arranged to employ a same processing kernel to perform a first-direction inverse residual transform operation and a second-direction inverse residual transform operation, wherein the first-direction inverse residual transform operation processes an inverse quantization output of an inverse quantization circuit to generate the intermediate inverse residual transform result to the transpose buffer; the second-direction inverse residual transform operation accesses the transpose buffer to retrieve the intermediate inverse residual transform result, and processes the intermediate inverse residual transform result to generate a final inverse residual transform result of the inverse second transform; and the final inverse residual transform result is further processed by an inverse transform circuit; and
  a bypass path, arranged to transmit residual transform data that is not needed to be processed by the shared inverse residual transform circuit
  wherein the bypass path is coupled between an output of the inverse quantization circuit and an input of the inverse transform circuit.

7. A partial decoding circuit with inverse second transform, comprising:
  a transpose buffer, arranged to store an intermediate inverse residual transform result of the inverse second transform; and
  a shared inverse residual transform circuit, arranged to employ a same processing kernel to perform a first-direction inverse residual transform operation and a second-direction inverse residual transform operation, wherein the first-direction inverse residual transform operation processes an inverse quantization output of an inverse quantization circuit to generate the intermediate inverse residual transform result to the transpose buffer; the second-direction inverse residual transform operation accesses the transpose buffer to retrieve the intermediate inverse residual transform result, and processes the intermediate inverse residual transform result to generate a final inverse residual transform result of the inverse second transform; and the final inverse residual transform result is further processed by an inverse transform circuit;
  wherein the inverse quantization circuit is part of the partial decoding circuit, the transpose buffer is further used as an inverse residual transform output buffer for storing the final inverse residual transform result of the inverse second transform, and the partial decoding circuit further comprises:
  an inverse quantization output buffer, wherein the inverse quantization circuit generates the inverse quantization output associated with a first portion of residual data in a process unit to the shared inverse residual transform circuit, and further generates another inverse quantization output to the inverse quantization output buffer; and
  a multiplexer, arranged to selectively connect the inverse quantization output buffer or the transpose buffer to set a multiplexer output.

8. The partial decoding circuit of claim 7, wherein said another inverse quantization output is associated with a second portion of the residual data in the process unit; the inverse quantization circuit outputs the inverse quantization output and said another inverse quantization output, sequentially; and the multiplexer output is fed into the inverse transform circuit.

9. The partial decoding circuit of claim 8, wherein the inverse quantization circuit performs computation associated with said another inverse quantization output and the shared inverse transform circuit processes the inverse quantization output in a parallel processing manner.

10. The partial decoding circuit of claim 7, further comprising:
  an inverse scan circuit, arranged to output a first inverse scan result associated with the first portion of residual data in the process unit, wherein the inverse quantization circuit processes the first inverse scan result to generate the inverse quantization output fed into the shared inverse residual transform circuit.

11. The partial decoding circuit of claim 10, wherein the inverse scan circuit outputs the first inverse scan result and a second inverse scan result associated with a second portion of the residual data in the process unit to the inverse quantization circuit, sequentially; the inverse quantization circuit processes the second inverse scan result to generate said another inverse quantization result; and the multiplexer output is fed into the inverse transform circuit.

12. The partial decoding circuit of claim 10, wherein the inverse scan circuit of the partial decoding circuit does not generate a second inverse scan result associated with a second portion of the residual data in the process unit, the inverse quantization circuit processes the second portion of the residual transform data in the process unit to generate said another inverse quantization result, and said another inverse quantization result is further processed by another inverse scan circuit.

13. The partial decoding circuit of claim 12, wherein the inverse quantization circuit processes the second portion of the residual transform data in the process unit and the shared inverse transform circuit processes the inverse quantization output in a parallel processing manner.

14. A partial encoding circuit with second transform, comprising:
  a transpose buffer, arranged to store an intermediate residual transform result of the second transform;
  a shared residual transform circuit, arranged to employ a same processing kernel to perform a first-direction residual transform operation and a second-direction residual transform operation, wherein the first-direction residual transform operation processes a transform output of a transform circuit to generate the intermediate residual transform result to the transpose buffer, the second-direction residual transform operation accesses the transpose buffer to retrieve the intermediate residual transform result, and processes the intermediate residual transform result to generate a final residual transform result of the second transform, and the final residual transform result is further processed by a quantization circuit; and a bypass path, arranged to transmit residual transform data that is not needed to be processed by the shared residual transform circuit
wherein the bypass path is coupled between an output of the transform circuit and an input of the quantization circuit.

* * * * *